United States Patent
Hikichi

(10) Patent No.: US 12,197,342 B2
(45) Date of Patent: Jan. 14, 2025

(54) ARITHMETIC PROCESSING DEVICE AND ARITHMETIC PROCESSING METHOD

(71) Applicant: Fujitsu Limited, Kawasaki (JP)

(72) Inventor: Toru Hikichi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/178,568

(22) Filed: Mar. 6, 2023

(65) Prior Publication Data

US 2023/0393988 A1    Dec. 7, 2023

(30) Foreign Application Priority Data

Jun. 6, 2022   (JP) .................................. 2022-091656

(51) Int. Cl.
*G06F 12/08* (2016.01)
*G06F 12/0831* (2016.01)
*G06F 12/0895* (2016.01)

(52) U.S. Cl.
CPC ...... *G06F 12/0895* (2013.01); *G06F 12/0833* (2013.01)

(58) Field of Classification Search
CPC .............................. G06F 12/08; G06F 12/0833
See application file for complete search history.

(56) References Cited

U.S. PATENT DOCUMENTS 5,835,941 A * 11/1998 Pawlowski ......... G06F 12/0846
711/119

6,502,218 B1 * 12/2002 George ............... G06F 11/1064
714/805

(Continued)

FOREIGN PATENT DOCUMENTS

EP           2634702 A1 *  9/2013  ......... G06F 12/0804
JP        2018-018513 A     2/2018

(Continued)

OTHER PUBLICATIONS

F. Hameed, A. A. Khan and J. Castrillon, "Improving the Performance of Block-based Dram Caches Via Tag-Data Decoupling," in IEEE Transactions on Computers, vol. 70, No. 11, pp. 1914-1927, Nov. 1, 2021.*

(Continued)

*Primary Examiner* — Pierre Michel Bataille
(74) *Attorney, Agent, or Firm* — Fujitsu Intellectual Property Center

(57) ABSTRACT

An arithmetic processing device includes: an arithmetic circuit that executes an instruction; a first cache which is coupled to the arithmetic circuit and which has a plurality of first entries each including a first tag region and a first data region that holds cache line data; a second tag region; a processor which controls the first cache based on information held in the second tag region; and a second cache which is coupled to the first cache via the processor and which includes a plurality of second entries each of which includes a third tag region and a second data region that holds cache line data. The second tag region includes a first region that holds first information which specifies whether or not the second data region holds cache line data which has the same address as the address of cache line data held in the first data region.

10 Claims, 16 Drawing Sheets

(56) References Cited

U.S. PATENT DOCUMENTS

| | | | |
|---|---|---|---|
| 2003/0009622 A1* | 1/2003 | Gaskins | G06F 9/3867 |
| | | | 712/E9.046 |
| 2015/0121011 A1* | 4/2015 | Huang | G06F 12/0886 |
| | | | 711/128 |
| 2015/0178211 A1* | 6/2015 | Hiramoto | G06F 12/0833 |
| | | | 711/143 |
| 2017/0212840 A1 | 7/2017 | Le et al. | |
| 2017/0255562 A1* | 9/2017 | Usui | G06F 12/0886 |
| 2017/0371793 A1* | 12/2017 | Saidi | G06F 12/0895 |
| 2018/0032437 A1 | 2/2018 | Stocksdale et al. | |
| 2019/0198083 A1 | 6/2019 | Biswas et al. | |
| 2020/0019499 A1* | 1/2020 | Yamaguchi | G06F 12/0873 |
| 2020/0175646 A1* | 6/2020 | Boyd | G06F 12/0846 |
| 2021/0248094 A1* | 8/2021 | Norman | G06F 12/0893 |
| 2023/0236961 A1* | 7/2023 | Geng | G06F 12/023 |
| | | | 711/3 |

FOREIGN PATENT DOCUMENTS

| | | |
|---|---|---|
| JP | 2019-506671 A | 3/2019 |
| JP | 2019-520636 A | 7/2019 |

OTHER PUBLICATIONS

S.-F. Hsiao, S.-Y. Lin, T.-C. Cheng and M.-Y. Tsai, "An Automatic Cache Generator Based on Content-Addressable Memory," APC-CAS 2006—2006 IEEE Asia Pacific Conference on Circuits and Systems, Singapore, 2006, pp. 1313-1316.*

Hong Wan, Tong Sun and Qing Yang, "CAT—caching address tags—a technique for reducing area cost of on-chip caches," Proceedings 22nd Annual International Symposium on Computer Architecture, Santa Margherita Ligure, Italy, 1995, pp. 381-390.*

* cited by examiner

FIG. 5

LLC-TAG 303 (FOR EACH WAY)

L1 TAG INFORMATION

| 28 BITS (PA[47:20]) | 2 BITS | 2 BITS | 8 BITS | 1 BIT |
|---|---|---|---|---|
| LL-TAG-AD | LL-ST | C-ST | C-PRS | LCK |

TAGD 402 (FOR EACH WAY)

| 28 BITS (PA[47:20]) | 2 BITS | 4 BITS | 1 BIT | 1 BIT | 1 BIT |
|---|---|---|---|---|---|
| LL-TAG-AD | LL-ST | LLC-PRS | LCK | EC-VAL | WRBK-CPLT |

EXTERNAL CACHE 200

| 15 BITS (PA[47:33]) | 1 BIT | 1 BIT |
|---|---|---|
| C-TAG-AD | VAL | DRTY |

TAG201

CACHE LINE (128 BYTES)

DT202

ARITHMETIC PROCESSING DEVICE AND ARITHMETIC PROCESSING METHOD

CROSS-REFERENCE TO RELATED APPLICATION

This application is based upon and claims the benefit of priority of the prior Japanese Patent Application No. 2022-91656, filed on Jun. 6, 2022, the entire contents of which are incorporated herein by reference.

FIELD

The embodiments discussed herein are related to an arithmetic processing device and an arithmetic processing method.

BACKGROUND

A system equipped with an arithmetic processing device such as a central processing unit (CPU) has multi-level caches for performance improvement. Recently, there has been known a system in which a dynamic random-access memory (DRAM) cache is coupled to a die including an internal cache in order to increase a cache capacity and improve access efficiency. In this system, in order to reduce the frequency of accesses to a tag directory of the DRAM cache, the die may be equipped with a tag directory cache in which the tag directory of the DRAM cache is copied.

Japanese National Publication of International Patent Application Nos. 2019-506671 and 2019-520636 and Japanese Laid-open Patent Publication No. 2018-18513 are disclosed as related art.

SUMMARY

According to an aspect of the embodiments, an arithmetic processing device includes: an arithmetic circuit that executes an instruction; a first cache which is coupled to the arithmetic circuit and which has a plurality of first entries each including a first tag region and a first data region that holds cache line data; a second tag region; a processor which controls the first cache based on information held in the second tag region; and a second cache which is coupled to the first cache via the processor and which includes a plurality of second entries each of which includes a third tag region and a second data region that holds cache line data. The second tag region includes a first region that holds first information which specifies whether or not the second data region holds cache line data which has the same address as the address of cache line data held in the first data region. In accordance with the first information held in the second tag region which corresponds to write-back target cache line data, the processor determines whether a write-back location to which the cache line data held in the first cache is to be written back is the second cache or an external memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an example of constituent elements of each of entries in an LLC-TAG in FIG. 2, a TAGD in FIG. 3, and an external cache;

DESCRIPTION OF EMBODIMENTS

For example, when a read request issued from a CPU core or the like causes a cache miss in the internal cache and the DRAM cache, data read from a main memory is stored in the internal cache and the DRAM cache. The data turns into an inclusion state in which the data held in the internal cache is also held in the DRAM cache.

In a cache system in an inclusion scheme, when data is written back from the DRAM cache to the main memory by a replacement process on the DRAM cache, data in the internal cache is also evicted. For this reason, the cache access performance may degrade in the inclusion scheme. For example, in a case where the DRAM cache employs a direct map scheme, the frequency of the replacement process is higher than that in a set associative scheme and accordingly the access performance may more easily degrade.

One conceivable solution to suppress degradation in the access performance is to allow the internal cache to continuously hold data when a replacement process on the DRAM cache occurs (separation of the inclusion state). However, in this case, the DRAM cache may hold data equivalent to the data held in the internal cache in some cases or may not hold the data in the other cases.

For this reason, in a case where data is written back from the internal cache, a write-back location to which the data is to be written back is determined to be the DRAM cache or the main memory by accessing the tag of the DRAM cache and checking the state of the tag. In a case where the tag of the DRAM cache is accessed every time data is written back from the internal cache, the cache access performance may deteriorate. For example, it is difficult to determine a write-back location of data from the internal cache only by holding tag information such as the modified exclusive shared invalid (MESI) protocol as a directory cache in the die.

According to one aspect, an object of the present disclosure is to suppress a degradation in cache access efficiency in an arithmetic processing device including caches in a hierarchical structure.

Hereinafter, the embodiments will be described with reference to the drawings.

Figure 1:
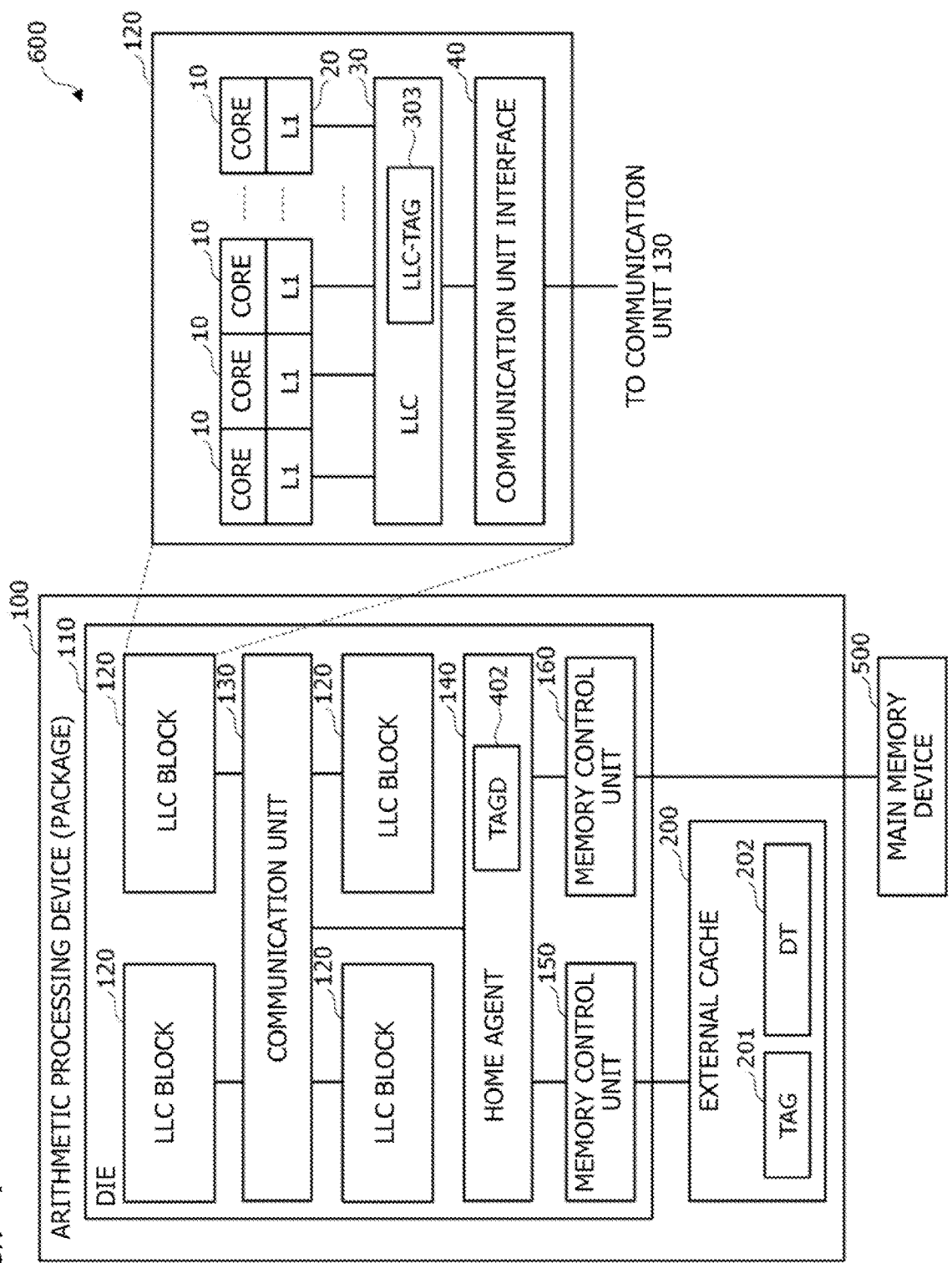
FIG. 1 is a block diagram illustrating an example of an arithmetic processing device according to an embodiment.

FIG. 1 illustrates an example of an arithmetic processing device according to an embodiment. An arithmetic processing device 100 illustrated in FIG. 1 includes a die (semiconductor chip) 110 and an external cache 200, and has, for example, a package form. A main memory device 500 is coupled to the arithmetic processing device 100. The arithmetic processing device 100 and the main memory device 500 operate as an information processing device 600.

The die 110 includes multiple last level cache (LLC) blocks 120, a communication unit 130, a home agent 140, and memory control units 150 and 160. Each LLC block 120 includes multiple cores 10, a L1 cache 20 provided for each core 10, an LLC 30, and a communication unit interface 40.

The LLC block 120 is an example of a cache block. Each of the cores 10 is an example of an arithmetic unit, and the LLC 30 is an example of a first cache. The home agent 140 is an example of a control unit. The external cache 200 is an example of a second cache, and the main memory device 500 is an example of an external memory.

Although the die 110 includes four LLC blocks 120 in the example illustrated in FIG. 1, the number of LLC blocks 120 mounted on the die 110 is not limited to four. For example, each LLC block 120 includes eight cores 10, but the number of cores 10 mounted in each LLC block 120 is not limited to eight. Hereinafter, a memory access request (a read request or a write request), a replacement request, a snoop request, or the like may be simply referred to as a request. Operations in a case where any one of the cores 10 issues a read request will be described below.

When each L1 cache 20 holds target data of a read request (load instruction) generated by the corresponding core 10, the L1 cache 20 responds to the core 10 with the target data. When each L1 cache 20 does not hold target data of a read request generated by the corresponding core 10, the L1 cache 20 transmits the read request to the LLC 30. Each L1 cache 20 responds to the core 10 with the target data transferred from the LLC 30. The L1 cache 20 may be included in the core 10.

For example, the LLC 30 employs the set associative scheme having multiple ways. The LLC 30 includes multiple entries capable of holding multiple pieces of data (cache line data), respectively. An index address is assigned to each of the multiple entries. For this reason, the multiple entries are capable of holding multiple pieces of data having the same index address.

Figure 2:
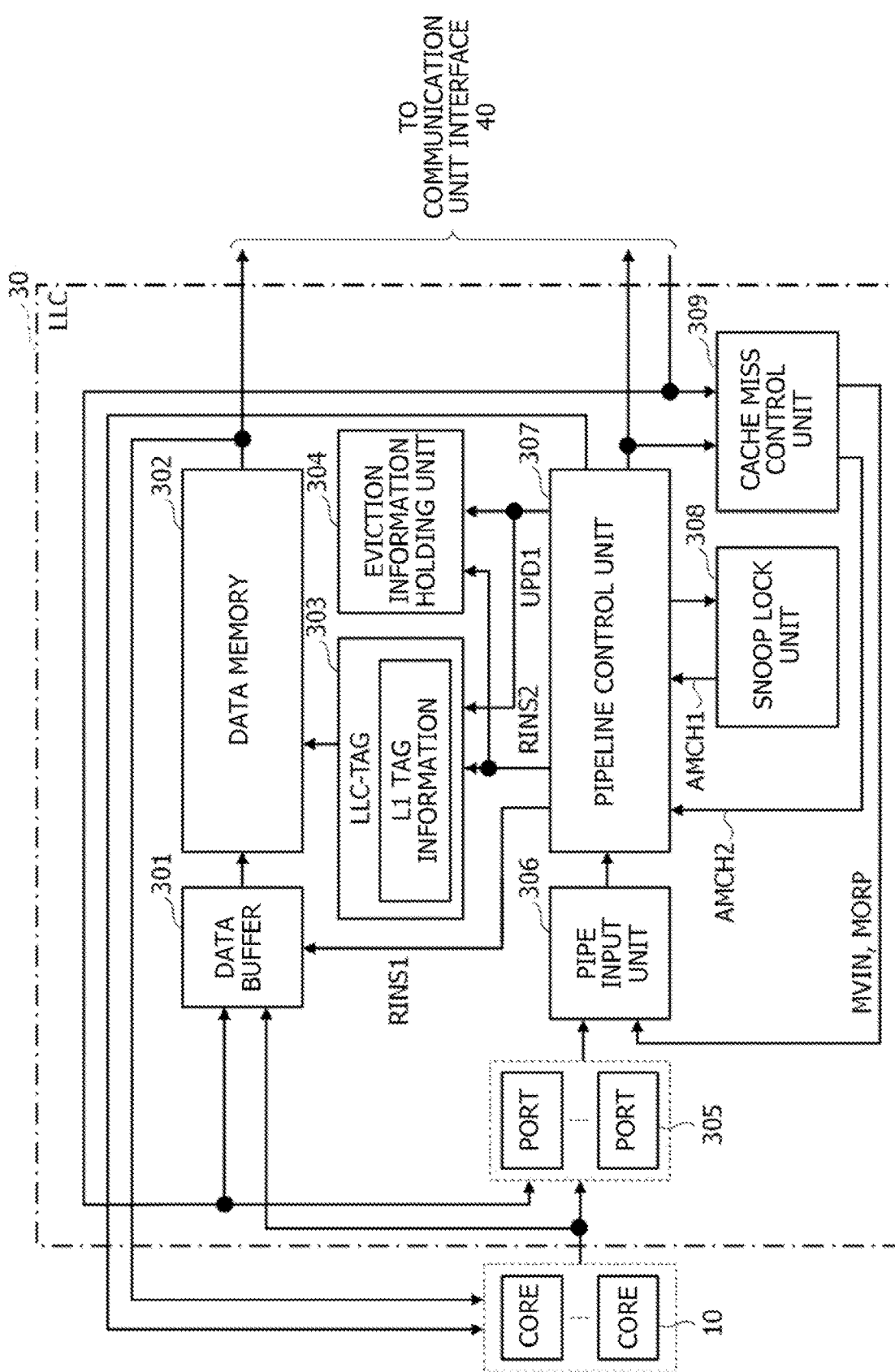
FIG. 2 is a block diagram illustrating an example of an LLC illustrated in FIG. 1.

When the LLC 30 holds the target data of a read request from any of the L1 caches 20, the LLC 30 responds to the L1 cache 20 with the target data. When the LLC 30 does not hold the target data of a read request from any of the L1 caches 20, the LLC 30 transmits the read request to the home agent 140 via the communication unit interface 40 and the communication unit 130. The LLC 30 responds to the L1 cache 20 with the target data transferred from the home agent 140. A configuration example of the LLC 30 is illustrated in FIG. 2.

The communication unit interface 40 controls communication between the LLC 30 and the communication unit 130. The communication unit 130 controls communication between each LLC block 120 and the home agent 140. The home agent 140 transmits a read request from each LLC block 120 to any one of the memory control units 150 and 160 and receives a response from any one of the memory control units 150 and 160. The home agent 140 performs coherent control between the LLCs 30 of the multiple LLC blocks 120 and the external cache 200.

For example, when receiving a read request from one of the LLC blocks 120 via the communication unit 130, the home agent 140 determines whether or not the target data is held in the external cache 200. When the target data is held in the external cache 200, the home agent 140 transmits the read request to the external cache 200 via the memory control unit 150. The home agent 140 receives, via the memory control unit 150, the target data read from the external cache 200 in response to the read request, and transmits the received target data to the LLC block 120 that is the issuer of the read request.

Figure 3:
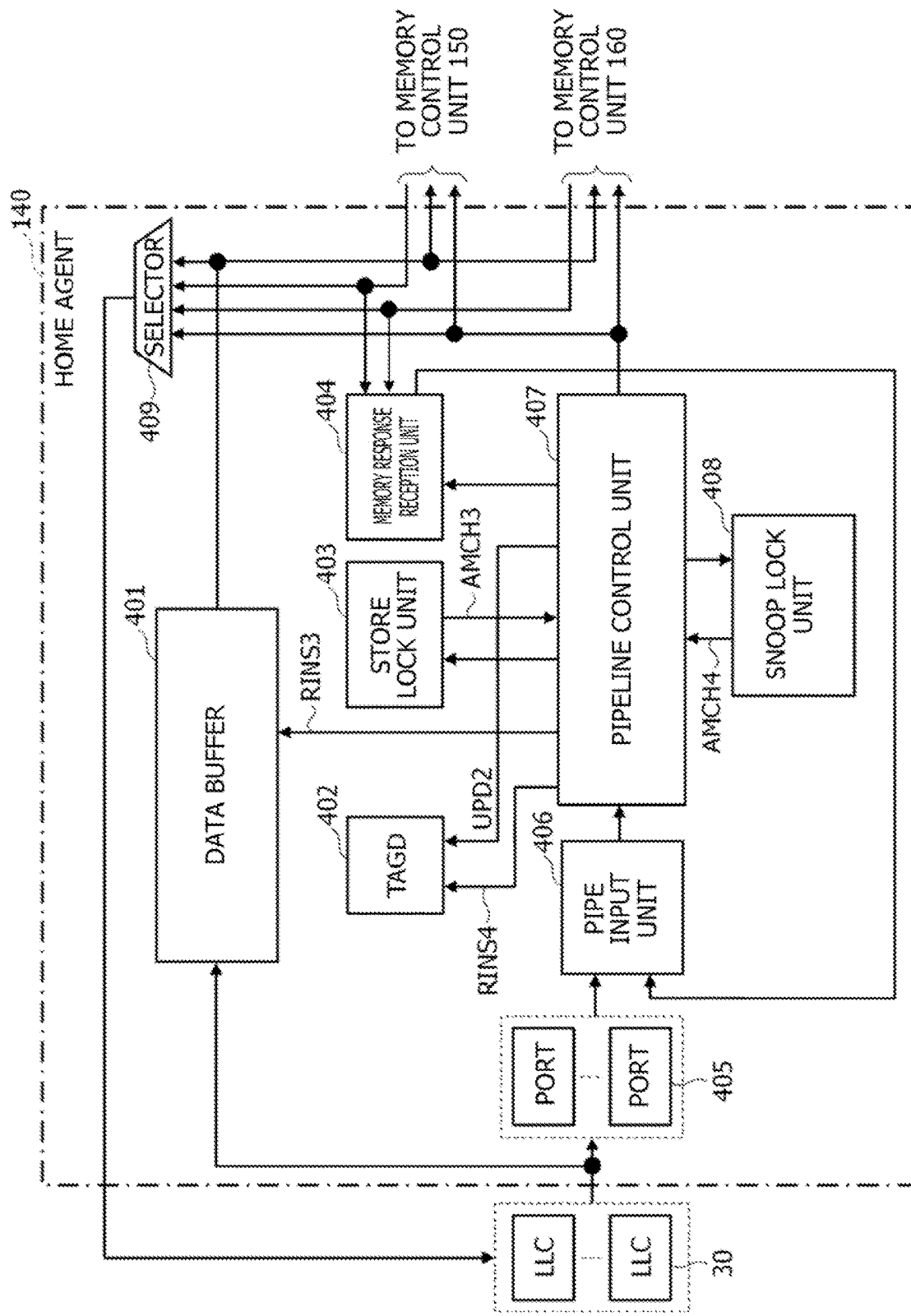
FIG. 3 is a block diagram illustrating an example of a home agent in FIG. 1.

When the target data is not held in the external cache 200, the home agent 140 transmits the read request to the main memory device 500 via the memory control unit 160. The home agent 140 receives, via the memory control unit 160, the target data read from the main memory device 500 in response to the read request, and transmits the received target data to the LLC block 120 that is the issuer of the read request. The home agent 140 stores the received target data in the external cache 200 via the memory control unit 150. A configuration example of the home agent 140 is illustrated in FIG. 3.

In this embodiment, the multiple LLCs 30 are coupled to the external cache 200 and the main memory device 500 via the home agent 140. For this reason, the home agent 140 is enabled to control data transfer between the multiple LLCs 30 and the external cache 200 and control data transfer between the multiple LLCs 30 and the main memory device 500. Since each of the multiple LLCs 30 does not have to control data transfer to and from the external cache 200 and the main memory device 500, the data transfer control by the cache operation may be simplified, and a degradation in the cache access efficiency may be suppressed.

The external cache 200 includes a TAG 201 (tag) for holding tag information and a data region DT202 for holding data. The TAG 201 is an example of a third tag region, and the data region DT202 is an example of a second data region. For example, the external cache 200 employs a direct map scheme having one way. The external cache 200 includes multiple entries each capable of holding one piece of data (cache line data). An index address is allocated to each of the multiple entries.

For this reason, every time a cache miss occurs at a certain entry in the external cache 200, the data held in the entry is evicted. For example, the external cache 200 is a broadband memory for a main memory such as a high bandwidth memory (HBM), a hybrid memory cube (HMC), or a multi-channel dynamic random-access memory (MCDRAM). The external cache 200 may be in the form of a chip or a package.

By accessing the TAG 201 in the external cache 200, the home agent 140 determines whether a cache hit or a cache miss occurs in the external cache 200. Since the external cache 200 is coupled to the outside of the die 110, the number of access cycles of the external cache 200 is larger than that of the LLC 30 mounted in the die 110. For this reason, it is preferable that the frequency of accesses to the TAG 201 below.

In the case were the external cache 200 is disposed between the LLCs 30 and the main memory device 500 and the external cache 200 is accessed when a cache miss occurs in the LLCs 30, it is possible to improve the throughput as compared with the case where the main memory device 500 is accessed. The L1 caches 20, the LLCs 30, and the external cache 200 may hold, as data, an instruction code to be executed by each core 10. For example, the main memory device 500 includes multiple dual inline memory modules (DIMMs).

For example, the memory capacity of the external cache 200 is larger than the memory capacity of the LLC 30 and smaller than the memory capacity of the main memory device 500. For example, the memory bandwidth of the external cache 200 is lower than the memory bandwidth of the LLC 30 and higher than the memory bandwidth of the main memory device 500.

In this embodiment, the external cache 200 does not apply an inclusion rule that guarantees that data held in the LLC 30 is certainly held in the external cache 200. For example, when new data is registered in the LLC 30 from the main memory device 500 and the same data is registered in the external cache 200, a replacement process for the same entry occurs in the external cache 200. In the replacement process, the data evicted from the external cache 200 to the main memory device 500 may be held in the LLC 30 in some cases.

When the inclusion rule is not applied, the data held in the LLC 30 corresponding to the data to be written back to the main memory device 500 remains held in the LLC 30 without being evicted, and thus the data is not in the inclusion state. In a write-back operation that occurs subsequently, the data not evicted in the LLC 30 is written back not to the external cache 200 but to the main memory device 500.

For this reason, as will be described later, the home agent 140 executes a process of determining the external cache 200 or the main memory device 500 as a write-back location from the LLC 30. In this process, the home agent 140 is able to determine the write-back location without accessing the external cache 200. Since an access to the external cache 200 for determining the write-back location may be omitted, a degradation in the memory access efficiency may be suppressed.

In this embodiment, when data is evicted from the external cache 200, the corresponding data does not have to be evicted from the LLC 30. Therefore, the control of the eviction may be simplified. As a result, it is possible to shorten a period in which accesses to the external cache 200 and the LLC 30 are disabled due to the eviction process, and to suppress a degradation in the access efficiency. For example, the external cache 200 in the direct map scheme even has a higher frequency of data eviction from the external cache 200 than in the set associative scheme, but may suppress a degradation in the access efficiency.

FIG. 2 illustrates an example of the LLC 30 in FIG. 1. The LLC 30 includes a data buffer 301, a data memory 302, an LLC-TAG 303 (tag), an eviction information holding unit 304, multiple ports 305, a pipe input unit 306, a pipeline control unit 307, a snoop lock unit 308, and a cache miss control unit 309. The data memory 302 is an example of a first data region, and the LLC-TAG 303 is an example of a first tag region.

The data buffer 301 has multiple entries which hold store data transferred from the cores 10 or data transferred from the communication unit interface 40. The data buffer 301 reads data held in the entry instructed by a read instruction RINS1 from the pipeline control unit 307, and outputs the read data to the data memory 302.

The data memory 302 has multiple entries capable of holding multiple pieces of cache line data, respectively. An index address expressed by a predetermined number of bits in an address included in a memory access request is allocated to each of the multiple entries. Based on the control by the pipeline control unit 307, the data memory 302 stores one piece of cache line data received from the data buffer 301 in any one of multiple data regions (ways) of the entry specified by the index address.

For example, in a case where a read request issued from one of the cores 10 in the LLC block 120 to which the LLC 30 belongs causes a cache hit in the LLC 30, data read from the data memory 302 is transferred as a data response to the core 10 that is the issuer of the read request. For example, when data for a read request issued from one of the cores 10 included in a different LLC block 120 is not held in the different LLC block 120 but is held in the LLC 30 of the owner LLC block 120, a cache miss occurs in the above different LLC block 120 to which the core 10 that is the issuer of the read request belongs. In this case, the different LLC block 120 issues a read request to the home agent 140. The home agent 140 determines the LLC 30 that holds the data by referring to a TAGD 402, and then instructs transfer of the read target data between the LLCs 30. The transfer target data read from the data memory 302 is transferred to the different LLC block 120 via the communication unit interface 40. In a write-back process, data read from the data memory 302 is transferred to the external cache 200 or the main memory device 500 via the communication unit interface 40.

The LLC-TAG 303 has a tag region for each way in each of the multiple entries in the data memory 302. The tag region in the LLC-TAG 303 includes a region for holding a copy of tag information of the L1 caches 20 (L1 tag information). According to a result of referring to the tag information by the pipeline control unit 307 (such as a cache hit or a cache miss), the LLC-TAG 303 outputs a control signal that controls data writing to the data memory 302 or data reading from the data memory 302.

In response to a read instruction RINS2 from the pipeline control unit 307, the LLC-TAG 303 outputs the tag information held in the instructed region to the pipeline control unit 307. In response to an update instruction UPD1 from the pipeline control unit 307, the LLC-TAG 303 updates the tag information. An example of the LLC-TAG 303 is illustrated in FIG. 5.

For example, the eviction information holding unit 304 holds, for each entry, information on a way that holds data to be evicted from the data memory 302 using a least recently used (LRU) algorithm. The eviction information held in the eviction information holding unit 304 is managed by the pipeline control unit 307.

The multiple ports 305 include multiple ports that receive memory access requests from the multiple cores 10, respectively, and a port that receives a write-back request, a snoop request, or the like from the home agent 140. A request received by each port 305 is output to the pipe input unit 306. The pipe input unit 306 sequentially inputs, to the pipeline control unit 307, requests enabled to be input among the multiple requests received from the multiple ports 305.

Based on the requests sequentially input from the pipe input unit 306, the pipeline control unit 307 performs determination of a cache hit/cache miss, management of the LLC-TAG 303, and management of the eviction information holding unit 304. When determining a cache hit, the pipeline control unit 307 controls data reading from the data memory 302. When determining a cache miss, the pipeline control unit 307 controls data eviction from the data memory 302 and controls storage of response data in the data memory 302.

The snoop lock unit 308 holds an address targeted for snooping until a snoop response is received after the pipeline control unit 307 issues a snoop request. When the snoop lock unit 308 holds the address received from the pipeline control unit 307, the snoop lock unit 308 outputs address match information AMCH1 to the pipeline control unit 307 to notify that the snoop lock is being executed. For example, the pipeline control unit 307 notified that the snoop lock is being executed keeps a snoop request targeting the same address from being redundantly issued.

The cache miss control unit 309 holds an address at which a cache miss occurs when the pipeline control unit 307 determines the cache miss. When the cache miss control unit 309 holds the address received from the pipeline control unit 307, the cache miss control unit 309 outputs address match information AMCH2 to the pipeline control unit 307.

When receiving the address match information AMCH2, the pipeline control unit 307 sets a lock flag LCK (FIG. 5) until response data for the address at which the cache miss occurs is transferred to the LLC 30, thereby keeping determination of a cache miss at the same address from being made redundantly.

The cache miss control unit 309 outputs a replacement request MORP for coping with a cache miss to the pipe input unit 306. When receiving response data corresponding to the cache miss, the cache miss control unit 309 outputs a move-in request MVIN to the pipe input unit 306. The pipeline control unit 307 to which the replacement request MORP or the move-in request MVIN is input from the pipe input unit 306 performs a process for the replacement request MORP or the move-in request MVIN.

FIG. 3 illustrates an example of the home agent 140 illustrated in FIG. 1. The communication unit interfaces 40 and the communication unit 130 arranged between the LLCs 30 and the home agent 140 are omitted in FIG. 3. The home agent 140 includes a data buffer 401, the TAGD 402 (tag), a store lock unit 403, a memory response reception unit 404, multiple ports 405, a pipe input unit 406, a pipeline control unit 407, a snoop lock unit 408, and a selector 409. The TAGD 402 is an example of a second tag region.

The data buffer 401 has multiple entries for holding data evicted from the LLCs 30. The data buffer 401 outputs the data held in the entry instructed by a read instruction RINS3 from the pipeline control unit 407 to the selector 409 and the memory control units 150 and 160.

The TAGD 402 has a region for holding tag information for each of cache line data regions allocated to the data memories 302 of the four LLCs 30. For example, the TAGD 402 holds the tag information of multiple ways for each entry in each LLC 30. In response to a read instruction RINS4 from the pipeline control unit 407, the TAGD 402 outputs the tag information held in the instructed region to the pipeline control unit 407. The TAGD 402 updates the tag information in response to an update instruction UPD2 from the pipeline control unit 407. An example of the TAGD 402 is illustrated in FIG. 5.

After issuing a write-back request (store request) to the external cache 200 or the main memory device 500, the store lock unit 403 holds the address targeted for the store until the write-back is completed. When the store lock unit 403 holds the address received from the pipeline control unit 407 as the target address, the store lock unit 403 outputs address match information AMCH3 to the pipeline control unit 407 to notify that the store lock is being executed. For example, the pipeline control unit 407 notified that the store lock is being executed keeps a request targeting the same address from being redundantly issued.

The memory response reception unit 404 receives response data to a request issued by the pipeline control unit 407 to the external cache 200 or the main memory device 500. The memory response reception unit 404 outputs the received response data to the pipe input unit 406, and causes the pipeline control unit 407 to register the tag information corresponding to the response data.

The multiple ports 405 include multiple ports that receive requests from the multiple LLCs 30, respectively. A request received by each port 305 is output to the pipe input unit 406. The pipe input unit 406 sequentially inputs, to the pipeline control unit 407, requests enabled to be input among the multiple requests received from the multiple ports 405.

Based on each of the requests sequentially input from the pipe input unit 406, the pipeline control unit 407 determines a cache hit/cache miss in the LLCs 30 other than LLC 30 that is the issuer of the request. At this time, the pipeline control unit 407 determines a cache hit/cache miss by using the information held in the TAGD 402. By using the information held in the TAGD 402, the pipeline control unit 407 manages data held in the data memory 302 of each LLC 30. The pipeline control unit 407 controls the output of the response data received by the memory response reception unit 404 to the pipe input unit 406 and updates the TAGD 402.

After the pipeline control unit 407 issues a snoop request to check whether data at a target address included in a request from a certain LLC 30 is held in a different LLC 30, the snoop lock unit 408 holds the address targeted for the snooping until a snoop response is received. When the snoop lock unit 408 holds the address received from the pipeline control unit 407 as the target address, the snoop lock unit 408 outputs address match information AMCH4 to the pipeline control unit 407 to notify that the snoop lock is being executed. For example, the pipeline control unit 407 notified that the snoop lock is being executed keeps a snoop request targeting the same address from being redundantly issued.

The selector 409 selects one from the data output from the data buffer 401, the snoop request output from the pipeline control unit 407, the response data output from the external cache 200, and the response data output from the main memory device 500, and outputs the selected one to the LLC 30.

Figure 4:
FIG. 4 is an explanatory diagram illustrating an example of allocation of physical addresses to be used in an LLC-TAG, a TAGD and a TAG in FIG. 1.

FIG. 4 illustrates an example of allocation of physical addresses PA [47:0] used in the LLC-TAG 303, the TAGD 402, and the TAG 201 in FIG. 1. The information processing device 600 illustrated in FIG. 1 is capable of accessing a memory space of 256 terabytes (TB) at maximum by using physical addresses of 48 bits. For this reason, the maximum capacity of the main memory device 500 is 256 TB.

A 28-bit physical address PA [47:20] of the LLC-TAG 303 of each LLC 30 and the TAGD 402 of the home agent 140 is used as a tag address LL-TAG-AD. A 13-bit physical address PA [19:7] of the LLC-TAG 303 and the TAGD 402 is used as an index address LL-INDX. For this reason, each LLC-TAG 303 has 8192 entries. The TAGD 402 has 32768 entries corresponding to the four LLCs 30. A 7-bit physical address PA [6:0] of the LLC-TAG 303 and the TAGD 402 is used as a cache line size CLSIZE of 128 bytes.

In each LLC 30, a cache hit is determined when a physical address PA [47:7] included in a memory access request matches a pair of the tag address LL-TAG-AD and the index address LL-INDX included in any of the entries. In each LLC 30, a cache miss is determined when a physical address PA [47:7] included in a memory access request does not match any pair of the tag addresses LL-TAG-AD and the index addresses LL-INDX in all the entries of the LLC 30.

A 15-bit physical address PA [47:33] in the TAG 201 of the external cache 200 is used as a tag address EC-TAG-AD. A 26-bit physical address PA [32:7] in the TAG 201 is used as an index address EC-INDX. For this reason, the TAG 201 has 67108854 entries. A physical address PA [6:0] of the TAG 201 is used as a cache line size CLSIZE of 128 bytes.

In the external cache 200, a cache hit is determined when a physical address PA [47:7] included in a memory access request matches a pair of the tag address EC-TAG-AD and the index address EC-INDX included in any of the entries. In the external cache 200, a cache miss is determined when a physical address PA [47:7] included in a memory access request does not match any pair of the tag addresses EC-TAG-AD and the index addresses EC-INDX in all the entries of the external cache 200.

FIG. 5 illustrates an example of constituent elements of each of entries of the LLC-TAG 303 in FIG. 2, the TAGD 402 in FIG. 3, and the external cache 200. The LLC-TAG 303 of each LLC 30 specifies information held for each way in each of the 8192 entries included in the LLC 30. The TAGD 402 of the home agent 140 specifies information held for each way in each of the 32768 entries included in the four LLCs 30. Although not particularly limited, each LLC 30 has 16 ways, for example.

The LLC-TAG 303 includes regions for storing a 28-bit tag address LL-TAG-AD and a 2-bit cache status LL-ST. The LLC-TAG 303 has regions for storing a 2-bit core status C-ST, an 8-bit core presence C-PRS, and a 1-bit lock flag LCK. In the core status C-ST and the core presence C-PRS, the tag information of the L1 caches 20 is copied.

A physical address PA [47:20] is stored in the region of the tag address LL-TAG-AD. For the cache status LL-ST and the core status C-ST, "00" indicates an invalid state I, "01" indicates a shared state S, "10" indicates a modified state M, and "11" indicates an exclusive state E. For example, the arithmetic processing device 100 employs the MESI protocol.

In the core presence C-PRS, the 8 bits correspond to the eight cores 10, respectively, and each indicate whether or not the data that the concerned entry of the LLC 30 holds in the data memory 302 is held in the corresponding L1 cache 20.

During a process for a request from one of the L1 caches 20 (for example, the core 10), the lock flag LCK is set to exclude requests from the other L1 caches 20. For example, the lock flag LCK is set when a cache miss occurs in the LLC 30, and is reset when data transferred from the external cache 200 or the main memory device 500 is stored in the data memory 302 of the LLC 30. While the lock flag LCK is being set, requests from the other L1 caches 20 are aborted.

The TAGD 402 of the home agent 140 specifies information held for each way in each of the 8192 entries included in each of the four LLCs 30 coupled to the home agent 140. For example, the TAGD 402 has 32768 entries for the four LLCs 30.

The TAGD 402 has regions for storing a 28-bit tag address LL-TAG-AD, a 2-bit cache status LL-ST, a 4-bit core presence LLC-PRS, and a 1-bit lock flag LCK. The TAGD 402 has regions for storing a 1-bit inclusion valid flag EC-VAL and a 1-bit write-back completion flag WRBK-CPLT. The inclusion valid flag EC-VAL is an example of first information, and the write-back completion flag WRBK-CPLT is an example of second information.

The tag address LL-TAG-AD and the cache status LL-ST hold the same information as the tag address LL-TAG-AD and the cache status LL-ST in the LLC-TAG 303. In the core presence LLC-PRS, the 4 bits correspond to the four LLCs 30, respectively, and each indicate whether or not the data that the concerned entry of the LLC 30 holds in the data memory 302 is held in any of the other LLCs 30.

During a process for a request from one of the LLCs 30, the lock flag LCK is set to exclude requests from the other LLCs 30. For example, the lock flag LCK is set when a memory access request from one of the LLCs 30 is input to the pipeline control unit 407, and is reset when the home agent 140 receives response data transferred from the external cache 200 or the main memory device 500. While the lock flag LCK is being set, requests from the other LLCs 30 are aborted.

For example, the inclusion valid flag EC-VAL is set when the data read from the main memory device 500 in response to a cache miss in the external cache 200 is stored in the LLC 30 and the external cache 200 and thereby turns into the inclusion state. The inclusion valid flag EC-VAL is reset when the target data is evicted from the external cache 200 while remaining held in the LLC 30 and thereby turns into a non-inclusion state. For example, the set state of the inclusion valid flag EC-VAL is "1", and the reset state of the inclusion valid flag EC-VAL is "0".

The write-back completion flag WRBK-CPLT is set when the target data is written back from the LLC 30 to the main memory device 500 and remains in the external cache 200. The write-back completion flag WRBK-CPLT in the set state is used to keep the target data in a dirty state held in the external cache 200 from being written back to the main memory device 500.

For example, when the write-back completion flag WRBK-CPLT is set, the pipeline control unit 407 of the home agent 140 recognizes that the write-back of the target data from the external cache 200 to the main memory device 500 is completed. This makes it possible to keep the data written back from the LLC 30 to the main memory device 500 from being overwritten with the old data from the external cache 200, and thereby inhibit a malfunction of the arithmetic processing device 100.

With the TAGD 402 holding the same information as a part of the information held in the LLC-TAG 303, the pipeline control unit 407 of the home agent 140 is able to perform cache control of each LLC 30 by using the information held in the TAGD 402.

With the TAGD 402 holding the information held in the LLC-TAG 303 of each LLC 30, the home agent 140 is able to grasp the status of the data held in each LLC 30. This makes it possible to reduce the frequency of accesses from the home agent 140 to each LLC 30 and suppress a degradation in the cache access efficiency.

The TAG 201 of the external cache 200 employing the direct map scheme specifies information held for one way in each of the 67,108,854 entries included in the external cache 200. The data region DT202 of the external cache 200 holds cache line data for one way in each of the 67,108,854 entries.

The tag TAG of the external cache 200 has regions for storing a 15-bit tag address C-TAG-AD, a 1-bit valid flag VAL, and a 1-bit dirty flag DRTY. The valid flag VAL is set when valid information is held in the tag TAG and the data region DT.

The dirty flag DRTY is set when data is written back from any one of the LLCs 30. For example, the dirty flag DRTY is set when data held at a predetermined address in the main memory device 500 and data held in the data region DT corresponding to the predetermined address are different from each other. The dirty flag DRTY in the set state indicates that data to be evicted from the external cache 200 has to be written back to the main memory device 500 in a replacement process on the external cache 200.

The data region DT of the external cache 200 has a region for holding a cache line of 128 bytes. The size of one cache line is not limited to 128 bytes.

When referring to the TAGD 402 by using the address included in a request, the pipeline control unit 407 of the home agent 140 performs address match check expressed in Formulas (1), (2), and (3).

$$\text{TAGD-HIT} = (\text{"LL-ST"} \mathrel{!=} \text{"00"}) \& (\text{RQ-PA}[47{:}20] == \text{"LL-TAG-AD"}) \quad (1)$$

$$\text{EC-INDX-MCH} = (\text{"LL-ST"} \mathrel{!=} \text{"00"}) \& (\text{RQ-PA}[32{:}20] == \text{LL-TAG-AD}(\text{PA}[32{:}20])) \quad (2)$$

$$\text{EC-VICTIM-HIT} = (\text{"LL-ST"} \mathrel{!=} \text{"00"}) \& (\text{RQ-PA}[32{:}20] == \text{LL-TAG-AD}(\text{PA}[32{:}20])) \& (\text{RQ-PA}[47{:}33] \mathrel{!=} \text{LL-TAG-AD}(\text{PA}[47{:}33])) \quad (3)$$

In Formulas (1) to (3), a symbol "!=" means to unequal, whereas a symbol "==" means to equal. A symbol "&" means a logical product. In Formulas (2) and (3), LL-TAG-AD(PA [32:20]) denotes 13 lower-order bits in the tag address LL-TAG-AD corresponding to the physical address PA [32:20]. In Formula (3), LL-TAG-AD(PA [47:33]) denotes 15 higher-order bits in the tag address LL-TAG-AD corresponding to the physical address PA [47:33].

In Formula (1), a flag TAGD-HIT is set to "1" when the cache status LL-ST of an entry in the TAGD 402 holding the same tag address LL-TAG-AD as the physical address PA [47:20] included in a request is not in the invalid state. The flag TAGD-HIT in the set state indicates a state (cache hit state) in which the target data of the request is held in any one of the four LLCs 30.

In Formula (2), a flag EC-INDX-MCH is set to "1" when the physical address PA [32:7] included in the request matches the index address EC-INDX of an entry that is not in the invalid state. For example, the flag EC-INDX-MCH in the set state indicates that an entry in the TAGD 402 (for example, any of the LLCs 30) holds the address included in the request.

Here, the lower-order bits [19:7] in the index address EC-INDX are equal to the index address LL-INDX. For this reason, the home agent 140 may determine matching of the index address EC-INDX by making comparison with the higher-order bits [32:20] held in the TAGD 402 without referring to the TAG 201 of the external cache 200. It is possible to reduce the number of bits used for determination of matching of the index address EC-INDX from 26 bits to 13 bits.

In Formula (3), a flag EC-VICTIM-HIT is set when the physical address PA included in a request matches the tag address LL-TAG-AD ([32:20]) and does not match the tag address LL-TAG-AD ([47:33]) in an entry that is not in the invalid state in the TAGD 402. For example, the flag EC-VICTIM-HIT is set when, in searching the TAGD 402 for an access target address, an entry is detected in which a bit value corresponding to the index address of the TAG 201 matches the index address and a bit value corresponding to the tag address of the TAG 201 does not match the tag address. The pipeline control unit 407 resets the flag EC-VAL of the entry corresponding to the flag EC-VICTIM-HIT in the set state to "0".

The flag EC-VICTIM-HIT in the set state indicates that the address of data different from the target data of a request is held in the target entry of the request in the external cache 200. For example, the flag EC-VICTIM-HIT in the set state indicates that data having the same address as data evictable from the external cache 200 by replacement is held in any of the entries in the LLCs 30.

For example, it is assumed that data in an entry corresponding to the flag EC-VICTIM-HIT in the set state is evicted from the external cache 200. In this case, the home agent 140 may determine that the data held in the LLC 30 corresponding to the data evicted from the external cache 200 turns into the non-inclusion state in the LLC 30.

Figure 6:
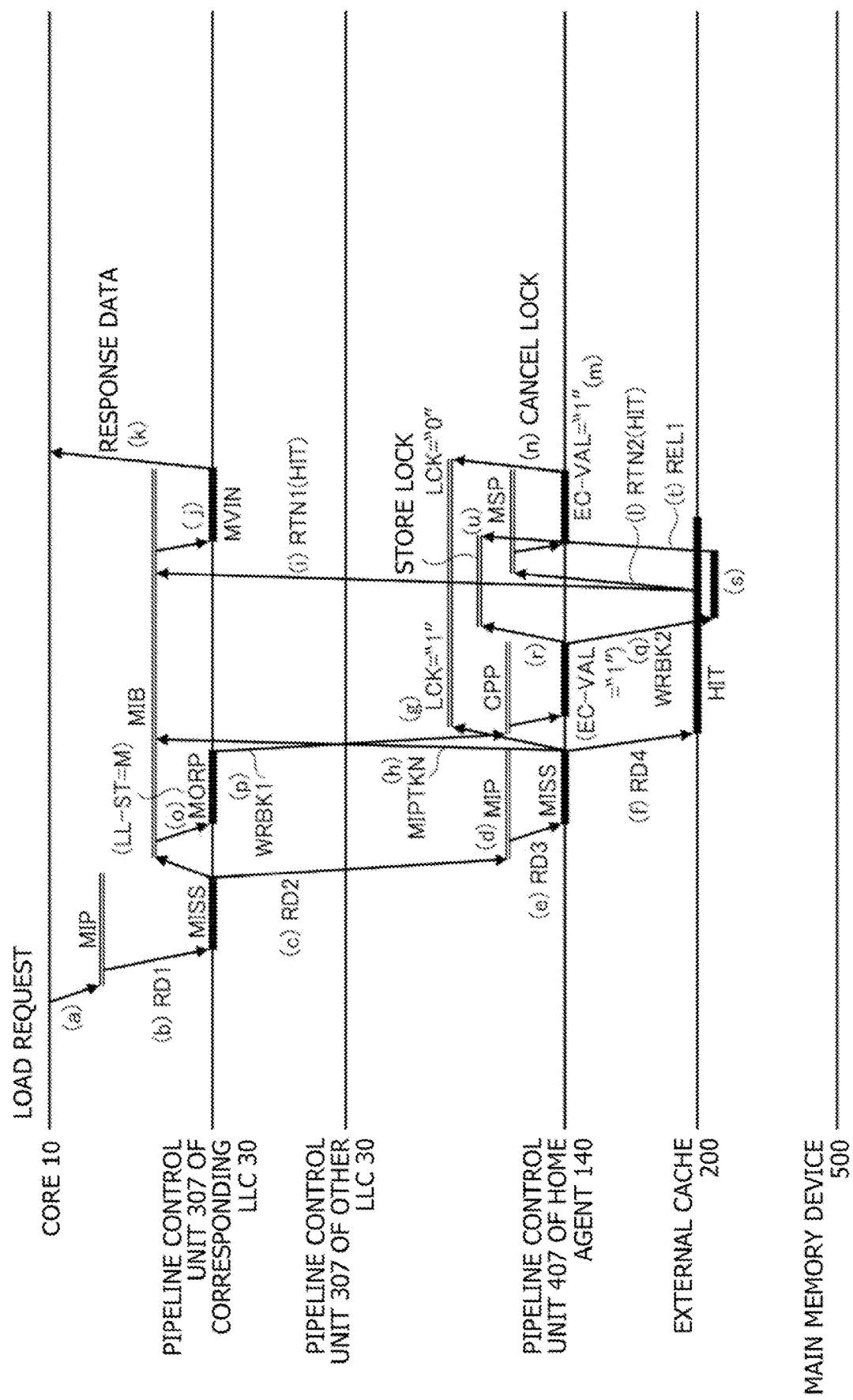
FIG. 6 is a timing chart illustrating an example of operations of the arithmetic processing device in FIG. 1.

FIG. 6 illustrates an example of operations of the arithmetic processing device 100 in FIG. 1. The operations illustrated in FIG. 6 are achieved by the arithmetic processing device 100 executing an arithmetic processing method. FIG. 6 illustrates an operation flow in a case where a read request RD having caused a cache miss in any LLC 30 causes a cache miss also in the home agent 140 (the other LLCs 30) and causes a cache hit in the external cache 200.

First, any one of the cores 10 in the LLC block 120 issues a load request ((a) in FIG. 6). The load request is held in a move-in port MIP of the LLC 30 (corresponding LLC) in the LLC block 120 to which the core 10 that is the issuer of the load request belongs. The move-in port MIP is one of the ports 305 of the LLC 30. The move-in port MIP inputs a read request RD1 to the pipeline control unit 307 via the pipe input unit 306 ((b) in FIG. 6). The pipeline control unit 307 determines a cache miss of the read request RD1, and issues a read request RD2 to the home agent 140 ((c) in FIG. 6).

A move-in port MIP of the home agent 140 holds the read request RD from the LLC 30 ((d) in FIG. 6). The move-in port MIP is one of the ports 405. The move-in port MIP inputs a read request RD3 to the pipeline control unit 407 via the pipe input unit 406 ((e) in FIG. 6). The pipeline control unit 407 searches the TAGD 402, and determines a cache miss because the target data of the read request RD3 is not held in any of the four LLCs 30. For example, the cache miss is determined in accordance with the flag TAGD-HIT="0" in Formula (1).

Since a cache hit occurs in the external cache 200 in the subsequent operation, the flag EC-VICTIM-HIT in Formula (3) is determined to be "0". Although not illustrated in FIG. 6, it is assumed that a cache miss occurs in the external cache 200 after that, and a process of writing back the data held in the modified state in the LLC 30 from the external cache 200 to the main memory device 500 occurs.

In this case, the pipeline control unit 407 determines that the flag EC-VICTIM-HIT is "1", and sets the inclusion valid flag EC-VAL of the corresponding entry in the TAGD 402 to "0". For example, when cache line data having the same address as the address of the cache line data held in the LLC 30 is written back from the external cache 200 to the main memory device 500 by the replacement process, the pipeline control unit 407 sets the inclusion valid flag EC-VAL for the address of the written-back cache line data to "0".

The cache line data is a unit of data transfer between the LLCs 30, the external cache 200, and the main memory device 500. The cache line data is held in each way of an entry in the data memory 302 of the LLC 30, and is held in an entry in the data region DT202 of the external cache 200.

Based on the determination of the cache miss, the pipeline control unit 407 issues a read request RD4 to the external cache 200 ((f) in FIG. 6). The pipeline control unit 407 executes an update process of the TAGD 402 such as setting the lock flag LCK to "1" ((g) in FIG. 6). With the lock flag LCK thus set, a process for another read request or the like for the target entry of the read request RD4 is disabled until a process of receiving the response data from the main memory device 500 is completed.

The pipeline control unit 407 outputs a read request process determination notification MIPTKN to a move-in buffer MIB of the LLC 30 that is the issuer of the read request RD2 ((h) in FIG. 6). For example, the move-in buffer MIB is provided in the cache miss control unit 309.

The external cache 200 determines a cache hit of the read request RD4. The external cache 200 outputs a response RTN1 (HIT) together with cache hit information to the move-in buffer MIB of the LLC 30 that is the issuer of the read request RD2 ((i) in FIG. 6). The pipeline control unit 307 stores the response data received by the move-in buffer MIB into the data memory 302 (MVIN), and updates the LLC-TAG 303 ((j) in FIG. 6). The pipeline control unit 307 responds with the response data to the core 10 that is the issuer of the load request ((k) in FIG. 6).

The external cache 200 outputs a response RTN2 (HIT)) including the target data and the cache hit information HIT to a port MSP of the home agent 140 ((l) in FIG. 6). The port MSP is provided in the memory response reception unit 404 of the home agent 140.

Since both the external cache 200 and the LLC 30 hold the target data through the response RTN2 (HIT), the pipeline control unit 407 sets the inclusion valid flag EC-VAL of the corresponding entry to "1" in a response process ((m) in FIG. 6). In the response process, the flag EC-INDX-MCH is "0" and the flag EC-VICTIM-HIT is "0". By resetting the lock flag LCK, the pipeline control unit 407 cancels the lock ((n) in FIG. 6).

Meanwhile, the cache miss control unit 309 of the LLC 30 (corresponding LLC)) issues a replacement request MORP to the pipeline control unit 307 by using the move-in buffer MIB based on the determination of the cache miss by the pipeline control unit 307 ((o) in FIG. 6). For example, the data to be evicted from the LLC 30 based on the replacement request MORP is updated in the LLC 30 (LL-ST=M). For this reason, a process of writing back the data to be evicted from the LLC 30 to either the external cache 200 or the main memory device 500 is performed as follows.

The pipeline control unit 307 in the LLC 30 issues a write-back request WRBK1 to the home agent 140 ((p) in FIG. 6). The home agent 140 receives the write-back request WRBK1 at a port CPP. The port CPP is one of the multiple ports 405. The port CPP inputs a read request to the pipeline control unit 407 via the pipe input unit 406.

When receiving the read request, the pipeline control unit 407 refers to the inclusion valid flag EC-VAL of the target entry in the TAGD 402. In the example illustrated in FIG. 6, the inclusion valid flag EC-VAL of the data to be evicted from LLC 30 is set to "1". For this reason, the pipeline control unit 407 determines to write back the data in the modified state to be evicted from the LLC 30 to the external cache 200. In this way, by referring to the inclusion valid flag EC-VAL, the home agent 140 is able to determine a write-back location of the data without reading the tag information from the TAG 201 of the external cache 200.

The pipeline control unit 407 outputs a write-back request WRBK2 to the external cache 200 ((q) in FIG. 6). At this time, the flag EC-INDX-MCH is "1" and the flag EC-VICTIM-HIT is "0".

The pipeline control unit 407 registers the index address of the target entry in the TAGD 402 in the store lock unit 403 to thereby perform store lock ((r) in FIG. 6). For example, the pipeline control unit 407 performs the store lock based on the flag EC-INDX-MCH="1".

When receiving the write-back request WRBK2, the external cache 200 stores the write-back target data in the data region DT202 and updates the TAG 201 ((s) in FIG. 6). The external cache 200 outputs a write-back completion response REL1 to the home agent 140 ((t) in FIG. 6). When receiving the write-back completion response REL1 via the pipe input unit 406, the pipeline control unit 407 cancels the store lock ((u) in FIG. 6).

In a case where the inclusion valid flag EC-VAL of the target entry of the write-back request WRBK1 is reset to "0" in the TAGD 402, the target address of the write-back request WRBK is not registered in the entry of the external cache 200. In this case, the pipeline control unit 407 is able to write back the target data to the main memory device 500 without reading the tag information from the TAG 201 of the external cache 200.

Figure 7:
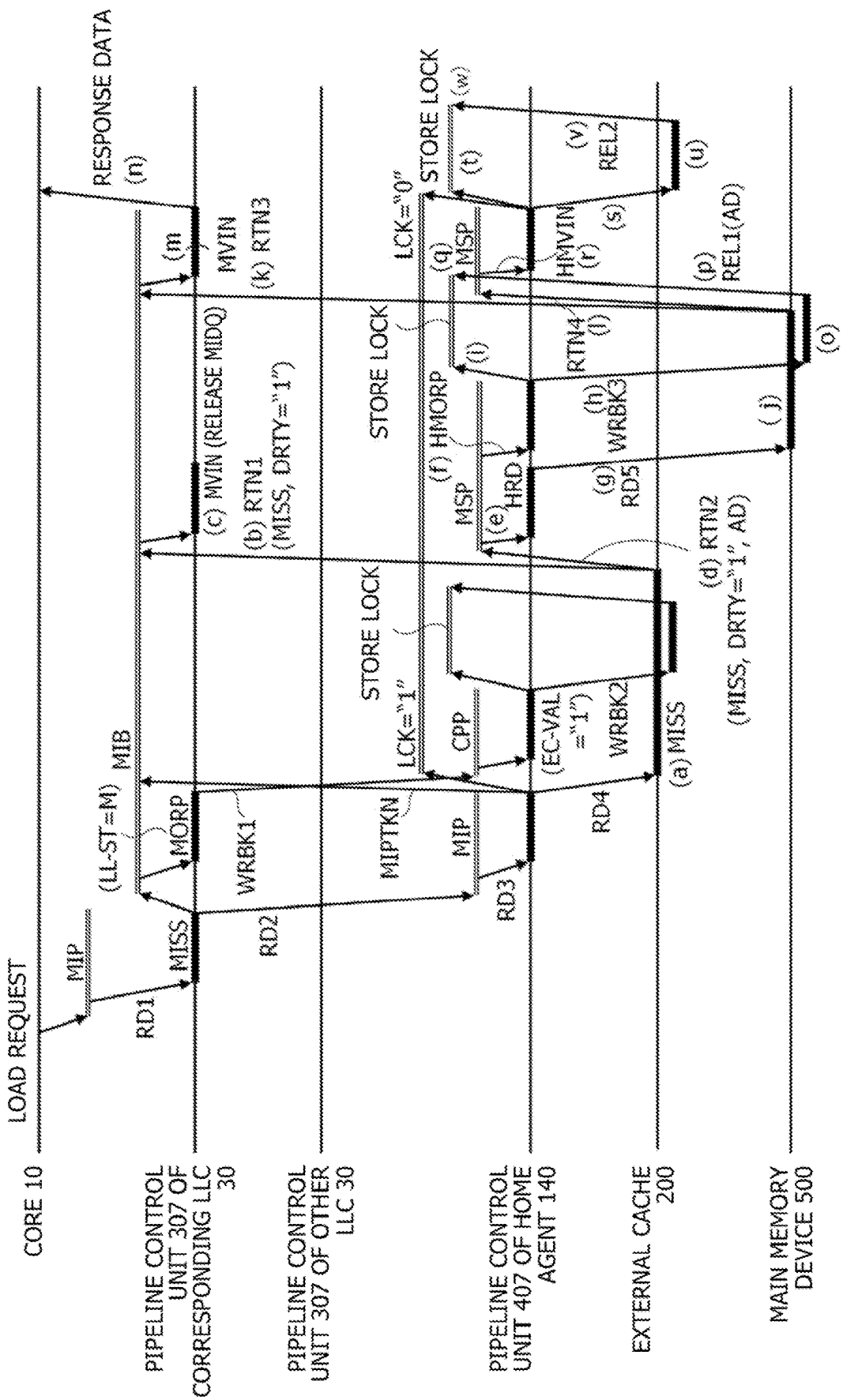
FIG. 7 is a timing chart illustrating another example of operations of the arithmetic processing device in FIG. 1.

FIG. 7 is a diagram illustrating another example of operations of the arithmetic processing device 100 in FIG. 1. The operations that are the same as or similar to those illustrated in FIG. 6 will not be described in detail. The operations illustrated in FIG. 7 are achieved by the arithmetic processing device 100 executing an arithmetic processing method. FIG. 7 illustrates an example in which a read request RD1 having caused a cache miss in any of the LLCs 30 causes a cache miss in the home agent 140 (the other LLCs 30) and the external cache 200, and the data is read from the main memory device 500.

In FIG. 7, a write-back address for replacement in the LLC 30 does not match a write-back address for replacement in the external cache 200. In this case, the write-back from the LLC 30 is performed to the external cache 200. The write-back address for replacement in the LLC 30 is also referred to as an LLC-Victim address or an eviction address. The write-back address for replacement in the external cache 200 is also referred to as an EC-Victim address or an eviction address. The operations up to the operation where a read request RD4 is issued to the external cache 200 in response to a load request from the core 10 and the write-back operation based on a replacement request MORP are the same as those illustrated in FIG. 6.

In FIG. 7, the read request RD for the external cache 200 causes a cache miss ((a) in FIG. 7). In the external cache 200, the cache miss occurs when the target entry in the TAG 201 corresponding to the target address of the read request RD4 does not hold the tag address matching the target address.

The external cache 200 employs a direct map scheme. For this reason, the data held in the target entry in the data memory 302 is evicted in order to store target data of a read request RD5 transferred from the main memory device 500. Since the external cache 200 detects the cache miss in (a) in FIG. 7, information specified by the TAG 201 at that time is in the state of EC-VICTIM-HIT="1". When VAL="1" and DIRTY="1" in the information in the TAG 201, the external cache 200 determines to write back the data to be evicted to the main memory device 500.

When determining the cache miss, the external cache 200 outputs a response RTN1 including cache miss information to the move-in buffer MIB of the LLC 30 that is the issuer of the read request RD2 ((b) in FIG. 7). The response RTN1 includes information on a dirty flag DRTY="1" indicating that the data held in the target entry of the read request RD2 is dirty. The response RTN1 may further include invalid data at the time of the cache miss.

Based on the response RTN1 received by the move-in buffer MIB, the pipeline control unit 307 performs a move-in process ((c) in FIG. 7). For example, in the move-in process, the pipeline control unit 307 releases a data region MIDQ in the data buffer 301 secured when the read request RD1 is input from the port MIP.

The external cache 200 outputs the cache miss information MISS, the dirty flag DRTY="1", and the target address AD as a response RTN2 to the port MSP of the home agent 140 ((d) in FIG. 7). The dirty flag DRTY="1" indicates that the data to be evicted from the external cache 200 is dirty and therefore has to be written back to the main memory device 500.

The port MSP outputs, to the pipeline control unit 407, a read request HRD to the main memory device 500 and a replacement request HMORP for evicting the data from the external cache 200 ((e) and (f) in FIG. 7). The address of the read request HRD is the same as the address of the load request from the core 10. The address of the replacement request HMORP includes the index address of the entry in the TAGD 402 specified in the load request from the core 10.

Without referring to the TAGD 402, the pipeline control unit 407 issues the read request HRD from the port MSP as a read request RD5 to the main memory device 500 ((g) in FIG. 7). Based on the replacement request HMORP from the port MSP, the pipeline control unit 407 detects that the write-back completion flag WRBK-CPLT of the write-back target entry in the TAGD 402 is "0", and determines to perform the write-back operation.

The pipeline control unit 407 issues a write-back request WRBK3 including the write-back data to the main memory device 500 ((h) in FIG. 7). The pipeline control unit 407 performs store lock by registering the index address of the replacement target entry in the TAGD 402 in the store lock unit 403 ((i) in FIG. 7).

Based on the read request RD5, the main memory device 500 reads the target data ((j) in FIG. 7). The main memory device 500 outputs a response RTN3 including the target data thus read to the move-in buffer MIB of the LLC 30 that is the issuer of the read request RD2 ((k) in FIG. 7). The main memory device 500 transfers a response RTN4 including the target data thus read to the port MSP of the home agent 140 ((l) in FIG. 7).

The pipeline control unit 307 stores the response data received at the move-in buffer MIB into the data memory 302 (MVIN)), and updates the LLC-TAG 303 ((m) in FIG. 7). The pipeline control unit 307 responds with the response data to the core 10 that is the issuer of the load request ((n) in FIG. 7).

The main memory device 500 writes back the data included in the write-back request WRBK3 to a memory unit ((o) in FIG. 7). The data included in the write-back request WRBK3 is data having been evicted from the LLC 30 before. The main memory device 500 notifies the home agent 140 of a completion response REL1 (including the target address AD) to the write-back request WRBK3 ((p) in FIG. 7). When receiving the write-back completion response REL, the store lock unit 403 releases the store-locked entry ((q) in FIG. 7).

The pipeline control unit 407 receives a move-in request HMVIN including the target data of the read request HRD from the port MSP ((r) in FIG. 7). The pipeline control unit 407 transfers the target data received from the port MSP together with the move-in request HMVIN to the external cache 200 ((s) in FIG. 7).

The pipeline control unit 407 resets the lock flag LCK of the target way of the target entry in the TAGD 402 to "0".

Since both the external cache 200 and the LLC 30 store the data from the main memory device 500, the pipeline control unit 407 sets the inclusion valid flag EC-VAL of the target way of the target entry in the TAGD 402 to "1". At this time, the pipeline control unit 407 may reset the write-back completion flag WRBK-CPLT set to "0" to "0". The pipeline control unit 407 registers the index address of the replacement target entry in the TAGD 402 into the store lock unit 403 to perform store lock ((t) in FIG. 7).

When receiving the target data of the move-in request HMVIN, the external cache 200 stores the received data into the data region DT202 and updates the TAG 201 ((u) in FIG. 7). The external cache 200 notifies the home agent 140 of a move-in completion response REL2 ((v) in FIG. 7). When receiving the move-in completion response REL2, the store lock unit 403 of the home agent 140 cancels the store lock ((w) in FIG. 7).

Figure 8:
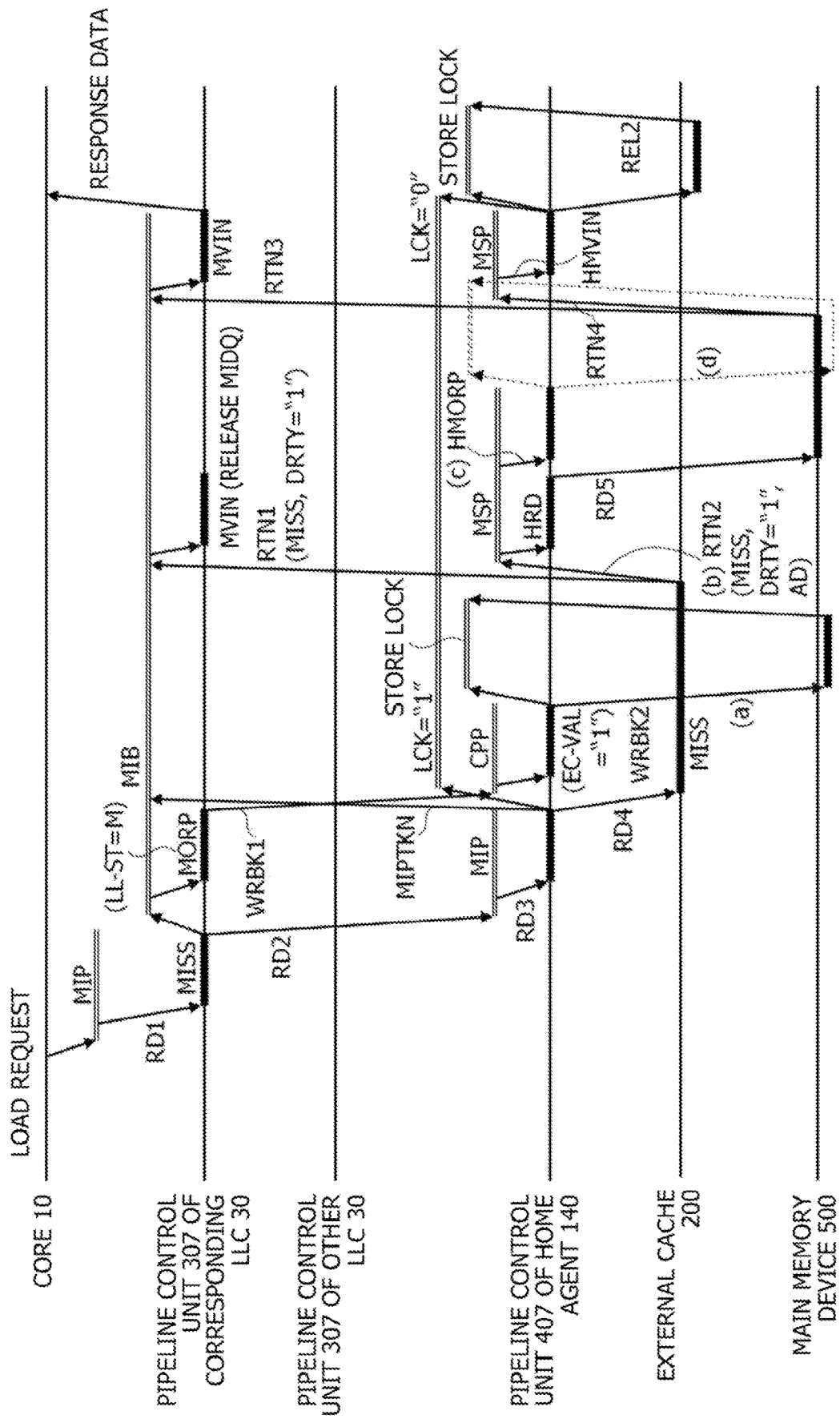
FIG. 8 is a timing chart illustrating still another example of operations of the arithmetic processing device in FIG. 1.

FIG. 8 is a diagram illustrating still another example of operations of the arithmetic processing device 100 in FIG. 1. The operations that are the same as or similar to those illustrated in FIGS. 6 and 7 will not be described in detail. The operations illustrated in FIG. 8 are achieved by the arithmetic processing device 100 executing an arithmetic processing method. FIG. 8 illustrates an example in which, as in FIG. 7, a read request RD1 having caused a cache miss in any of the LLCs 30 causes a cache miss in the home agent 140 (the other LLCs 30) and the external cache 200, and the data is read from the main memory device 500.

However, in FIG. 8, the write-back address for replacement in the LLC 30 matches the write-back address for replacement in the external cache 200. In this case, the write-back from the LLC 30 is performed to the main memory device 500 ((a) in FIG. 8). For example, in FIG. 8, in a case where the write-back process is executed after the read process based on a read request RD3, the pipeline control unit 407 searches the TAGD 402 to detect an entry indicating the lock flag LCK="1", the inclusion valid flag EC-VAL="0", the flag EC-INDX-MCH="1", and a flag EC-TAG-UNMCH="1".

The flag EC-TAG-UNMCH indicates that the tag address LL-TAG-AD does not match the physical address PA [47:20] included in the request. Based on the detection of the entry described above, the pipeline control unit 407 detects that the write-back address for replacement in the LLC 30 matches the write-back address for replacement in the external cache 200. At the timing of the write-back from the LLC 30 to the main memory device 500, the pipeline control unit 407 sets the write-back completion flag WRBK-CPLT of the write-back target entry in the TAGD 402 to "1".

The pipeline control unit 407 receives a replacement request HMORP output from the port MSP based on a response RTN2 from the external cache 200 ((b) and (c) in FIG. 8). Since the write-back completion flag WRBK-CPLT of the write-back target entry in the TAGD 402 is "1", the pipeline control unit 407 determines to cancel the write-back operation ((d) in FIG. 8).

In FIG. 8, broken lines following the replacement request HMORP indicate that the write-back operation is not performed. Thus, it is possible to keep the write-back operation for the same address from being performed twice. Actually, since the write-back operation indicated by the broken lines is omitted, it is possible to advance the timing at which the external cache 200 notifies the home agent 140 of a completion response REL2. As a result, a degradation in the cache access efficiency may be suppressed.

Figure 9:
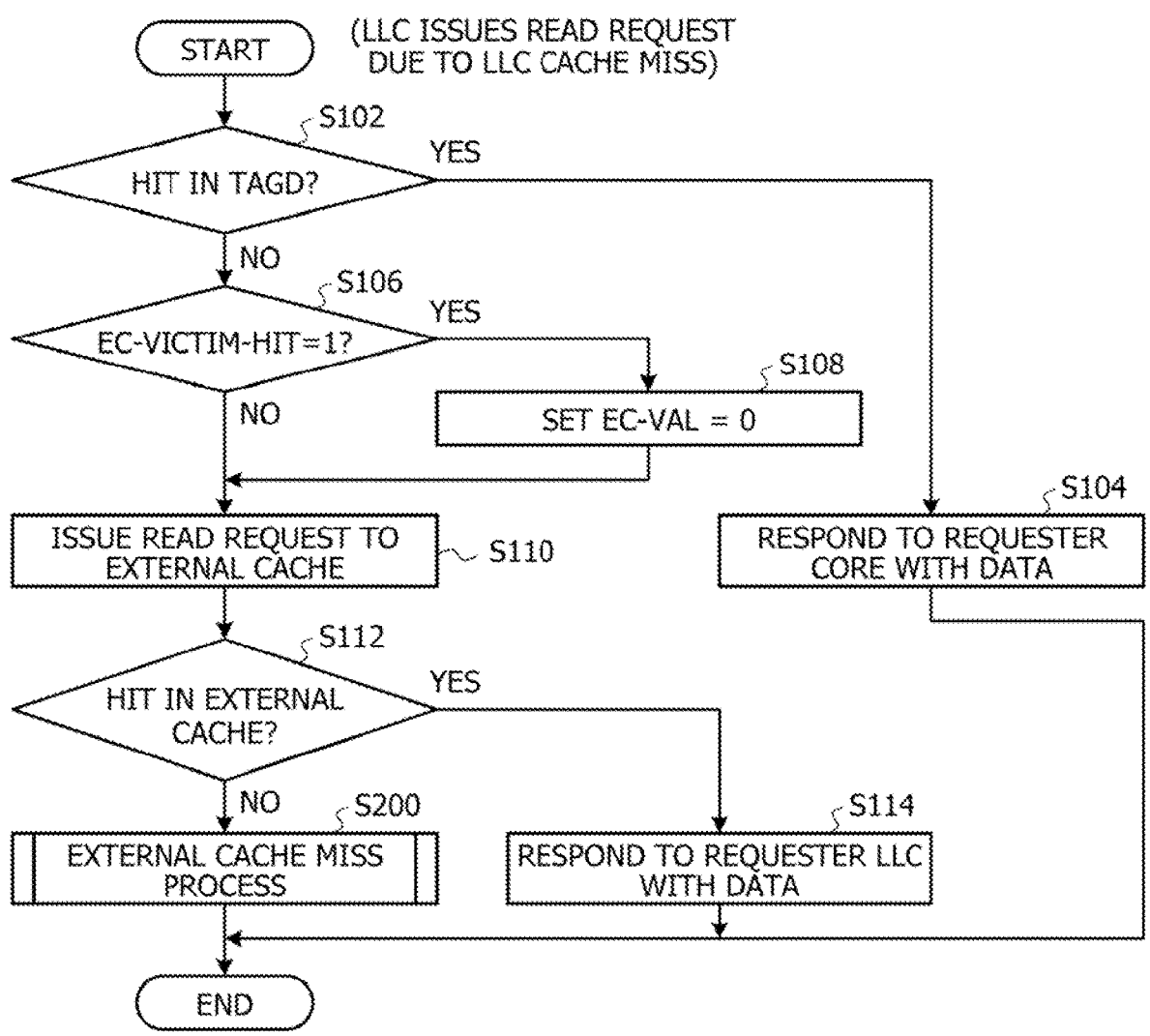
FIG. 9 is a flowchart illustrating an example of operations of the arithmetic processing device in FIG. 1.

FIG. 9 is a diagram illustrating an example of an operation flow of the arithmetic processing device 100 in FIG. 1. For example, FIG. 9 illustrates an example of an arithmetic processing method of the arithmetic processing device 100. Operations illustrated in FIG. 9 are started when an LLC 30 determines a cache miss and issues a read request to the home agent 140. For example, FIG. 9 illustrates the operations after the read request RD2 in FIGS. 6, 7, and 8 is issued. The operations illustrated in FIG. 9 represent operations mainly performed by the home agent 140.

First, at step S102, the home agent 140 refers to the TAGD 402 and determines whether or not a cache hit occurs. The home agent 140 performs step S104 when determining a cache hit or performs step S106 when determining a cache miss.

At step S104, since the cache hit occurs in an LLC 30 other than the LLC 30 that is the issuer of the read request, the home agent 140 reads the target data of the read request from the data memory 302 of the LLC 30 in which the cache hit occurs. The operations illustrated in FIG. 9 are ended. The home agent 140 responds with the read data to the core 10 of the LLC block 120 that has issued the read request RD. FIGS. 6 to 8 illustrate the operations in a case where the read request RD1 causes a cache miss in all the LLCs 30, and thus do not illustrate the process at step S104.

At step S106, the home agent 140 determines whether or not the flag EC-VICTIM-HIT is "1". The home agent 140 performs step S108 when the flag EC-VICTIM-HIT is "1" or performs step S110 when the flag EC-VICTIM-HIT is "0". The flag EC-VICTIM-HIT="0" indicates that the target data of the read request is held in the external cache 200 and thus is in the inclusion state. The flag EC-VICTIM-HIT="1" indicates that the target data of the read request is not held in the external cache 200 and thus is in the non-inclusion state.

At step S108, the home agent 140 sets the inclusion valid flag EC-VAL to "0" because the target data of the read request is in the non-inclusion state. After that, the operations proceed to step S110. At step S110, the home agent 140 issues a read request to the external cache 200 (for example, RD4 in FIG. 6).

Next, at step S112, the home agent 140 determines whether or not a cache hit occurs in the external cache 200 based on the information received from the external cache 200. The home agent 140 performs step S114 when determining a cache hit or performs step S200 when determining a cache miss.

At step S114, the home agent 140 receives the target data of the read request read by the external cache 200 from the data region DT202. The home agent 140 responds with the received target data to the LLC block 120 including the core 10 that has issued the read request. The LLC block 120 transfers the received target data to the core 10 that has issued the read request. The operations illustrated in FIG. 9 are ended.

At step S200, based on the cache miss in the external cache 200, the home agent 140 executes a cache miss process including issuing a read request RD to the main memory device 500 and acquiring the read target data. An example of the process at step S200 is illustrated in FIG. 10.

Figure 10:
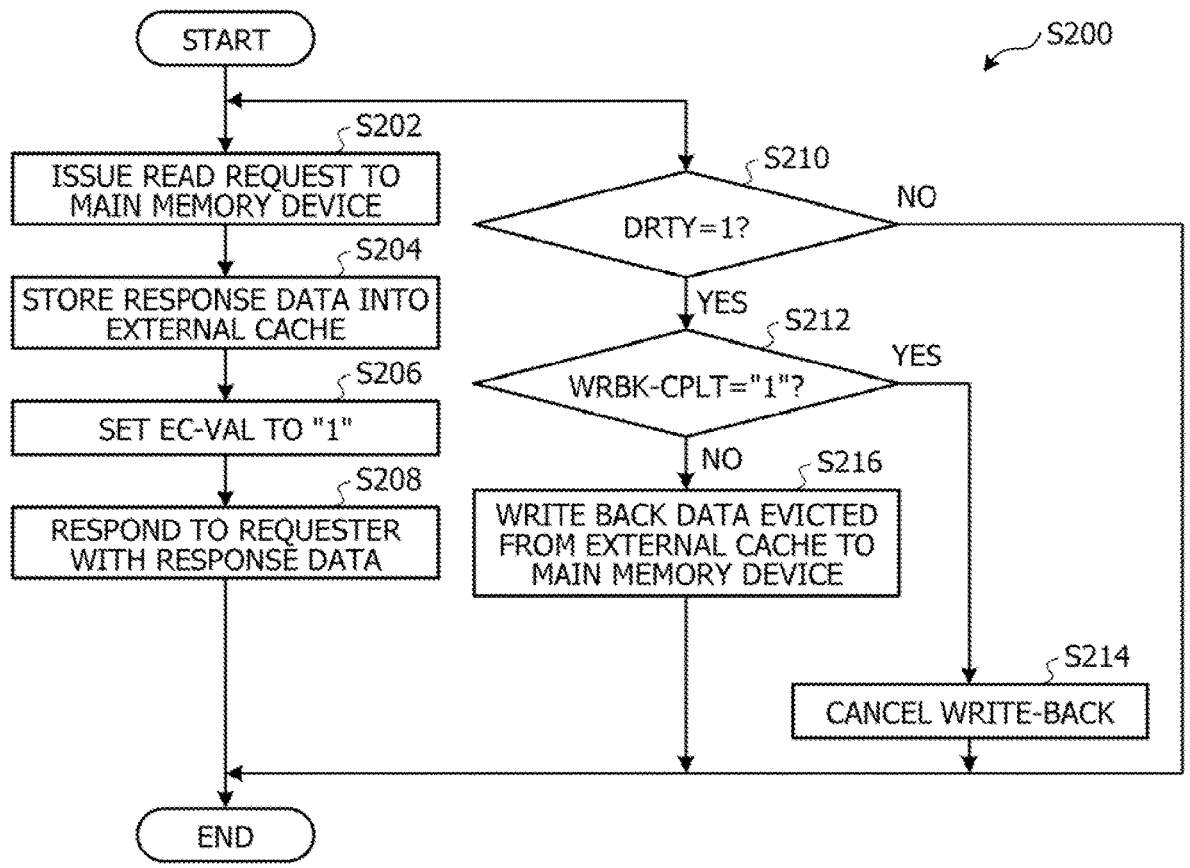
FIG. 10 is a flowchart illustrating an example of a process at step S200 in FIG. 9.

FIG. 10 illustrates the example of the process at step S200 in FIG. 9. In step S200, operations at steps S202 to S208 for reading the target data of the read request from the main memory device 500 and operations at steps S210 to S216 for writing back the data to be evicted from the external cache 200 to the main memory device 500 are executed in parallel.

At step S202, the home agent 140 issues the read request to the main memory device 500 (for example, RD5 in FIGS. 7 and 8). Next, at step S204, the home agent 140 stores the response data transferred from the main memory device 500 into the external cache 200.

Subsequently, at step S206, the home agent 140 sets the inclusion valid flag EC-VAL of the target way of the entry in the TAGD 402 specified by the target address of the read request to "1". The inclusion valid flag EC-VAL of "1" indicates that the target data of the read request RD is stored in both the LLC 30 and the external cache 200 and thus turns into the inclusion state. Next, the home agent 140 responds to the LLC 30 that is the issuer of the read request with the target data of the read request transferred from the main memory device 500 at step S208, and ends the operations illustrated in FIG. 10.

Meanwhile, at step S210, the home agent 140 determines whether or not the dirty flag DRTY of the eviction target data included in a response from the external cache 200 is "1". For example, the dirty flag DRTY is included in the response RTN2 in FIGS. 7 and 8. When the dirty flag DRTY is "1", the home agent 140 performs step S212 to execute the write-back. When the dirty flag DRTY is "0", the home agent 140 skips execution of the write-back, and thus ends the operations illustrated in FIG. 10.

At step S212, the home agent 140 determines whether or not the flag WRBK-CPLT of the target way of the entry in the TAGD 402 specified by the target address of the read request is "1". When the flag WRBK-CPLT is "1", the address of the data in the modified state to be evicted from the LLC 30 is the same as the address of the data in the dirty state to be evicted from the external cache 200.

For this reason, when the flag WRBK-CPLT is "1", the home agent 140 performs step S214 in order to preferentially write back the data in the modified state to be evicted from the LLC 30 to the main memory device 500. An operation in a case where the flag WRBK-CPLT="1" is determined at step S212 corresponds to the operation in FIG. 8. An operation of writing back data to be evicted from the LLC 30 to the main memory device 500 will be described with reference to FIG. 11.

On the other hand, when the flag WRBK-CPLT is "0", the address of the data in the modified state to be evicted from the LLC 30 is different from the address of the data in the dirty state to be evicted from the external cache 200. For this reason, the home agent 140 performs step S216 to write back the data in the modified state evicted from the external cache 200 to the main memory device 500. The operation in a case where the flag WRBK-CPLT="0" is determined at step S212 corresponds to the operation in FIG. 7.

The home agent 140 cancels the write back of the data from the external cache 200 to the main memory device 500 at step S214 in order to preferentially perform the write back of the data from the LLC 30 to the main memory device 500, and ends the operations illustrated in FIG. 10. The home agent 140 writes back the data in the modified state evicted from the external cache to the main memory device 500 at step S216, and ends the operations illustrated in FIG. 10.

Figure 11:
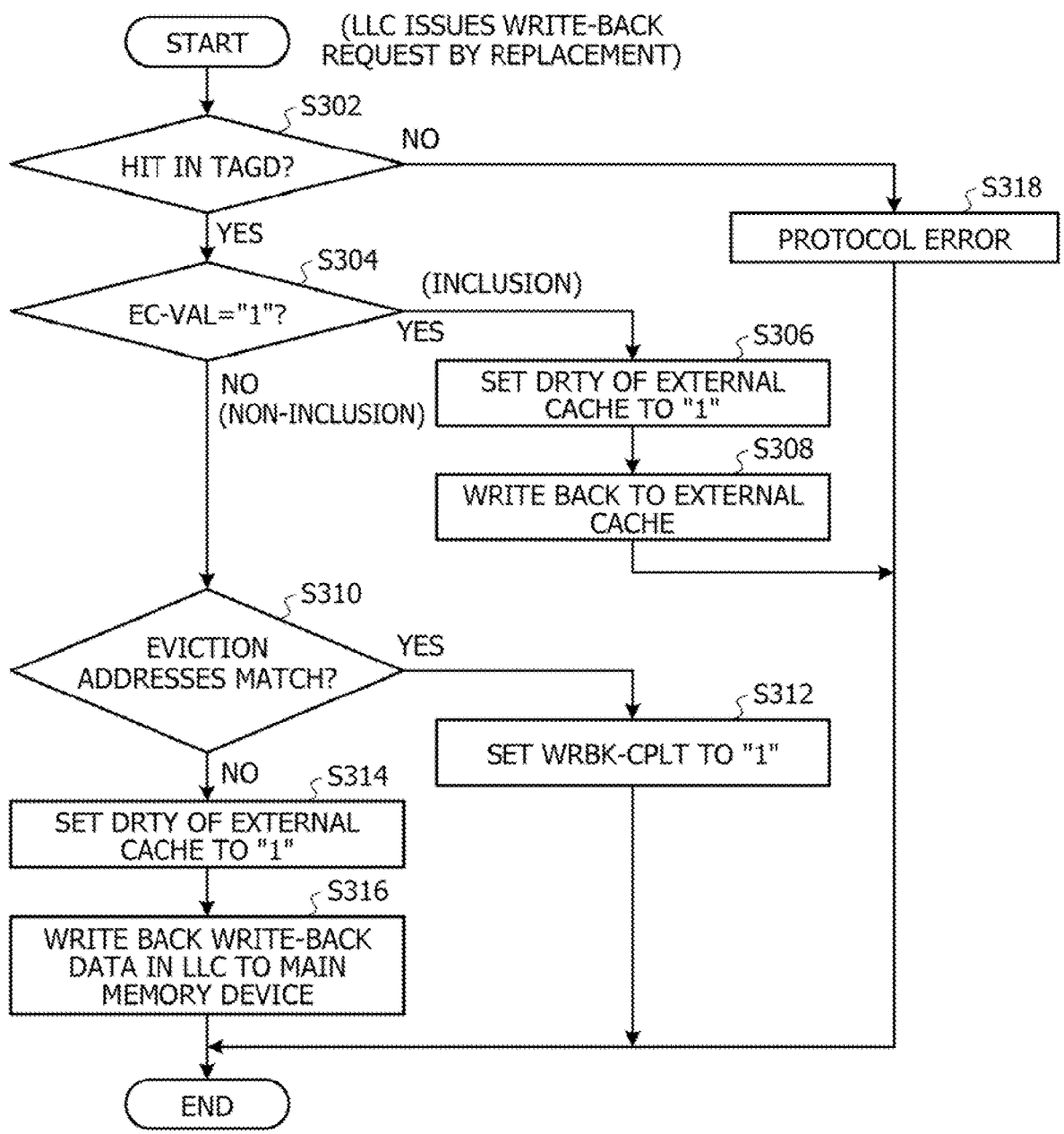
FIG. 11 is a flowchart illustrating another example of operations of the arithmetic processing device in FIG. 1.

FIG. 11 is a diagram illustrating another example of an operation flow of the arithmetic processing device 100 in FIG. 1. For example, FIG. 11 illustrates an example of an arithmetic processing method of the arithmetic processing device 100. Operations illustrated in FIG. 11 are started when an LLC 30 issues a write-back request WRBK by replacement to the home agent 140 based on a cache miss in the LLC 30. For example, FIG. 11 illustrates operations after the write-back request WRBK1 in FIGS. 6, 7, and 8 is issued. The operations illustrated in FIG. 11 represent operations mainly performed by the home agent 140. The write-back target data to be evicted from the LLC 30 is assumed to be in the modified state.

First, at step S302, the home agent 140 refers to the tag information of a way that holds eviction target data in the TAGD 402, and determines whether or not the TAGD is in a hit state. The hit state of the TAGD indicates that the eviction target data is held in the data memory 302 of the LLC 30. The home agent 140 performs step S304 when the TAGD is in the hit state or performs step S318 when the TAGD is not in the hit state.

At step S304, the home agent 140 determines whether or not the inclusion valid flag EC-VAL of the way that holds the eviction target data in the TAGD 402 is "1". When the inclusion valid flag EC-VAL is "1", the write-back target data is in the inclusion state and therefore the home agent 140 performs step S306 in order to write back the data to the external cache 200.

On the other hand, when the inclusion valid flag EC-VAL is "0", the target data is in the non-inclusion state and therefore the home agent 140 performs step S310 in order to write back the data to the main memory device 500.

At step S306, the home agent 140 outputs, to the external cache 200, information for setting the dirty flag DRTY of the entry having the data to be written back to "1" in the TAG 201 of the external cache 200. Next, the home agent 140 writes back the write-back target data to the external cache 200 at step S308, and ends the operations illustrated in FIG. 11.

At step S310, the home agent 140 determines whether or not the eviction address of the LLC 30 matches the eviction address of the external cache 200. When the eviction addresses match, the home agent 140 performs step S312 in order to cancel the write-back from the external cache 200 to the main memory device 500. When the eviction addresses do not match, the home agent 140 performs step S314 in order to enable the write-back from the external cache 200 to the main memory device 500.

A match between the eviction addresses is determined when the tag address of an entry locked by the read request in the TAG 201 of the external cache 200 does not match the corresponding bits in the address of the read request.

At step S312, the home agent 140 sets the flag WRBK-CPLT of the target way of the entry in the TAGD 402 specified by the write-back target address to "1". Thus, it is possible to cancel the write-back of the entry having the flag WRBK-CPLT set to "1" to the main memory device 500, and to keep the write-back from being redundantly performed.

At step S314, the home agent 140 outputs, to the external cache 200, information for setting the dirty flag DRTY of the entry having the data to be written back to "1" in the TAG 201 of the external cache 200. Next, the home agent 140 writes back the write-back target data in the LLC 30 to the main memory device 500 at step S316, and ends the operations illustrated in FIG. 11.

At step S318, the home agent 140 detects the occurrence of a protocol error because there is no data to be evicted from the LLC 30, and then ends the operations illustrated in FIG. 11. For example, when the protocol error occurs, the home agent 140 may notify a higher-level control device that manages the arithmetic processing device 100 of the occurrence of the protocol error.

As described above, in this embodiment, the inclusion valid flag EC-VAL indicating whether the data held in the LLC 30 is in the inclusion state or the non-inclusion state is provided in the TAGD 402. Thus, by referring to the inclusion valid flag EC-VAL, the home agent 140 is able to determine a write-back location of the data held in the LLC 30 without reading the tag information from the TAG 201 of the external cache 200. Since an access to the external cache 200 for determining the write-back location may be omitted, a degradation in the memory access efficiency may be suppressed. Accordingly, in the arithmetic processing device 100 including the caches in the hierarchical structure, a degradation in the cache access efficiency may be suppressed.

When the access target data is stored in the external cache 200 and the LLC 30 at the time of a cache miss, the home agent 140 sets the inclusion valid flag EC-VAL to "1". When the data corresponding to the data held in the LLC 30 is written back from the external cache 200 to the main memory device 500 by the replacement process, the home agent 140 resets the corresponding inclusion valid flag EC-VAL to "0". Accordingly, the value of the inclusion valid flag EC-VAL may be changed in accordance with a change in the holding states of the data held in the LLC 30 and the external cache 200. As a result, the home agent 140 is able to correctly write back the data from the LLC 30 by referring to the inclusion valid flag EC-VAL.

The write-back completion flag WRBK-CPLT set when data corresponding to data written back from the LLC 30 to the main memory device 500 remains in the external cache 200 is provided in the TAGD 402. Thus, when the write-back completion flag WRBK-CPLT is set, the home agent 140 is able to cancel the write-back from the external cache 200 to the main memory device 500. This makes it possible to keep the write-back operation for the same address from being performed twice and suppress a degradation in the cache access efficiency.

Accordingly, in the arithmetic processing device 100 including the caches in the hierarchical structure, a degradation in the cache access efficiency may be suppressed. It is possible to keep the data written back from the LLC 30 to the main memory device 500 from being overwritten with the old data from the external cache 200, and to inhibit a malfunction of the arithmetic processing device 100.

The multiple LLCs 30 are coupled to the external cache 200 and the main memory device 500 via the home agent 140. For this reason, the home agent 140 is enabled to control data transfer between the multiple LLCs 30 and the external cache 200 and control data transfer between the multiple LLCs 30 and the main memory device 500. Since each of the multiple LLCs 30 does not have to control data transfer to and from the external cache 200 and the main memory device 500, the data transfer control by the cache operation may be simplified, and a degradation in the cache access efficiency may be suppressed.

With the TAGD 402 holding the information held in the LLC-TAG 303 of each LLC 30, the home agent 140 is able to grasp the status of the data held in each LLC 30. This makes it possible to reduce the frequency of accesses from the home agent 140 to each LLC 30 and suppress a degradation in the cache access efficiency.

Figure 12:
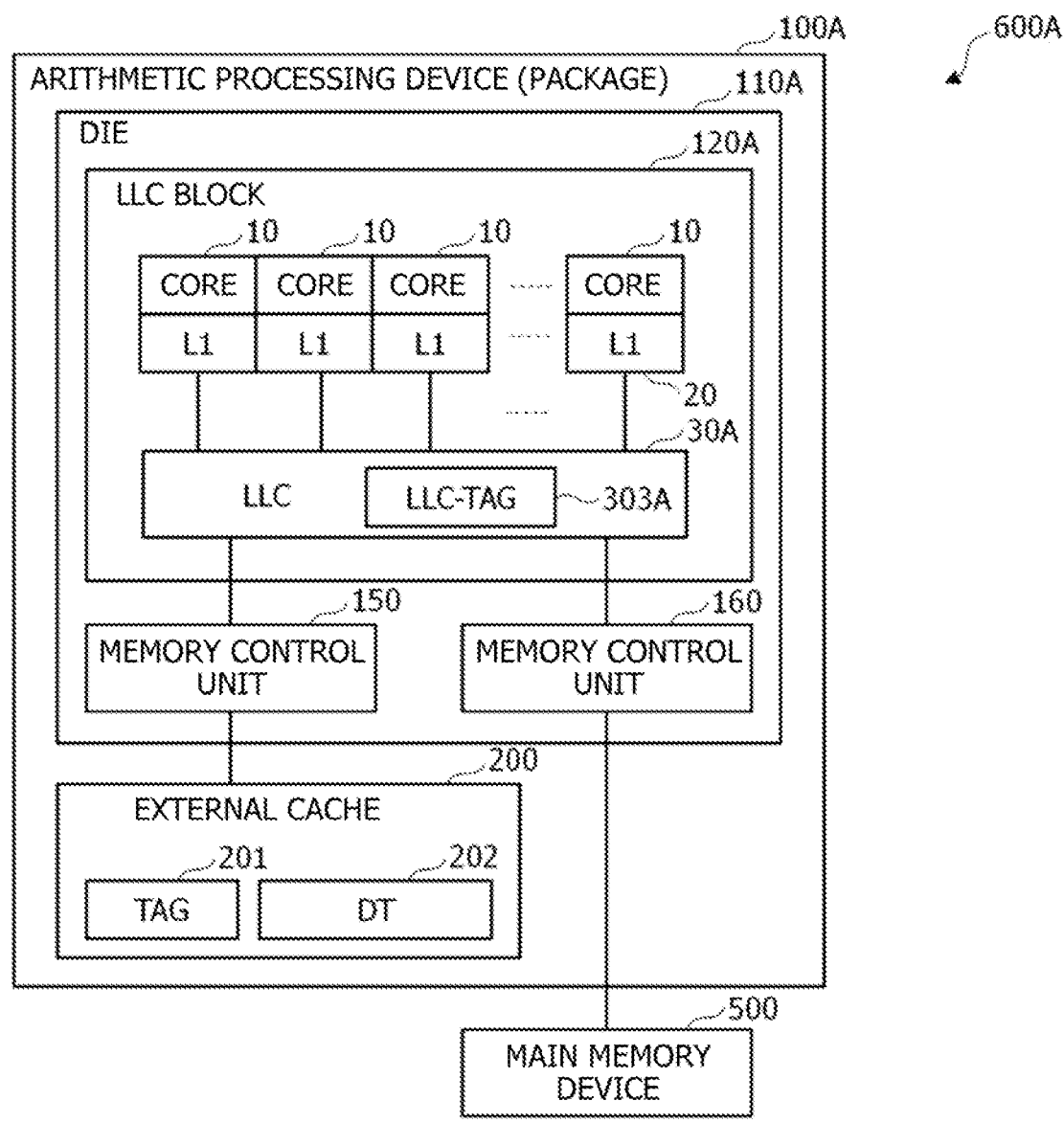
FIG. 12 is a block diagram illustrating an example of an arithmetic processing device according to another embodiment.

FIG. 12 illustrates an example of an arithmetic processing device according to another embodiment. The elements that are the same as or similar to those illustrated in FIG. 1 will not be described in detail. An arithmetic processing device 100A illustrated in FIG. 12 includes a die (semiconductor chip) 110A and an external cache 200, and has, for example, a package form. A main memory device 500 is coupled to the arithmetic processing device 100A. The external cache 200 and the main memory device 500 are the same as or similar to the external cache 200 and the main memory device 500 illustrated in FIG. 1, respectively. The arithmetic processing device 100A and the main memory device 500 operate as an information processing device 600A.

The die 110A includes an LLC block 120A and memory control units 150 and 160. The LLC block 120A includes multiple cores 10, a L1 cache 20 provided for each core 10, and an LLC 30A, and does not include the communication unit interface 40 illustrated in FIG. 1. The cores 10, the L1 caches 20, and the memory control units 150 and 160 are the same as or similar to the cores 10, the L1 caches 20, and the memory control units 150 and 160 illustrated in FIG. 1, respectively.

Figure 13:
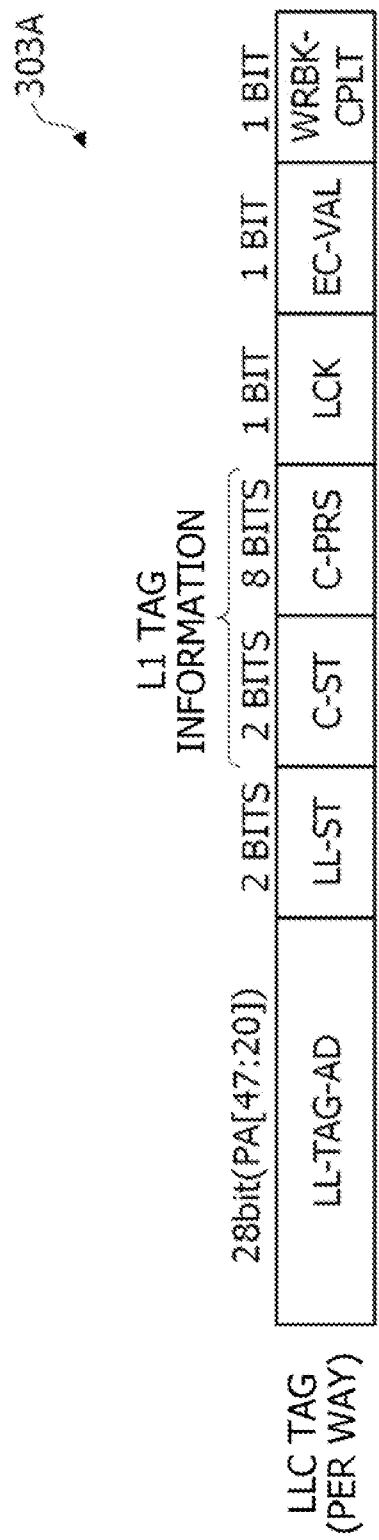
FIG. 13 is an explanatory diagram illustrating an example of constituent elements of an LLC-TAG in FIG. 12.

As in the case of the LLC 30 illustrated in FIG. 1, the LLC 30A employs a set associative scheme having multiple ways, and has multiple entries capable of respectively holding multiple pieces of data having the same index address. The LLC 30A has an LLC-TAG 303A (tag). An example of the LLC-TAG 303A is illustrated in FIG. 13. The LLC-TAG 303A is an example of a first tag region and a second tag region.

The LLC 30A has a configuration and functions similar to those of the LLC 30 illustrated in FIG. 2 except that the LLC 30A includes the LLC-TAG 303A instead of the LLC-TAG 303. For example, the LLC 30A includes a data buffer 301, a data memory 302, an eviction information holding unit 304, multiple ports 305, a pipe input unit 306, a pipeline control unit 307, a snoop lock unit 308, and a cache miss control unit 309, which are similar to those illustrated in FIG. 2. The pipeline control unit 307 included in the LLC 30A is an example of a control unit.

FIG. 13 illustrates an example of constituent elements of the LLC-TAG 303A in FIG. 12. The elements that are the same as or similar to those illustrated in FIG. 5 will not be described in detail. The constituent elements of each entry in the external cache 200 are the same as or similar to those illustrated in FIG. 5. In the LLC-TAG 303A, a 1-bit inclusion valid flag EC-VAL and a 1-bit write-back completion flag WRBK-CPLT are added to the LLC-TAG 303 illustrated in FIG. 5.

Methods of using the inclusion valid flag EC-VAL and the write-back completion flag WRBK-CPLT are the same as the methods of using the inclusion valid flag EC-VAL and the write-back completion flag WRBK-CPLT in the TAGD 402 illustrated in FIG. 5, respectively. The arithmetic processing device 100A according to this embodiment does not include multiple LLC blocks 120.

For this reason, the arithmetic processing device 100A does not include the home agent 140 illustrated in FIG. 1, and the functions of the home agent 140 are implemented by the LLC block 120A. For example, the pipeline control unit 307 in the LLC 30A has functions of setting the inclusion valid flag EC-VAL and the write-back completion flag WRBK-CPLT. Allocation of the index addresses in the LLC-TAG 303A and the TAG 201 is the same as the allocation of the index addresses in the LLC-TAG 303 and the TAG 201 illustrated in FIG. 4.

Figure 14:
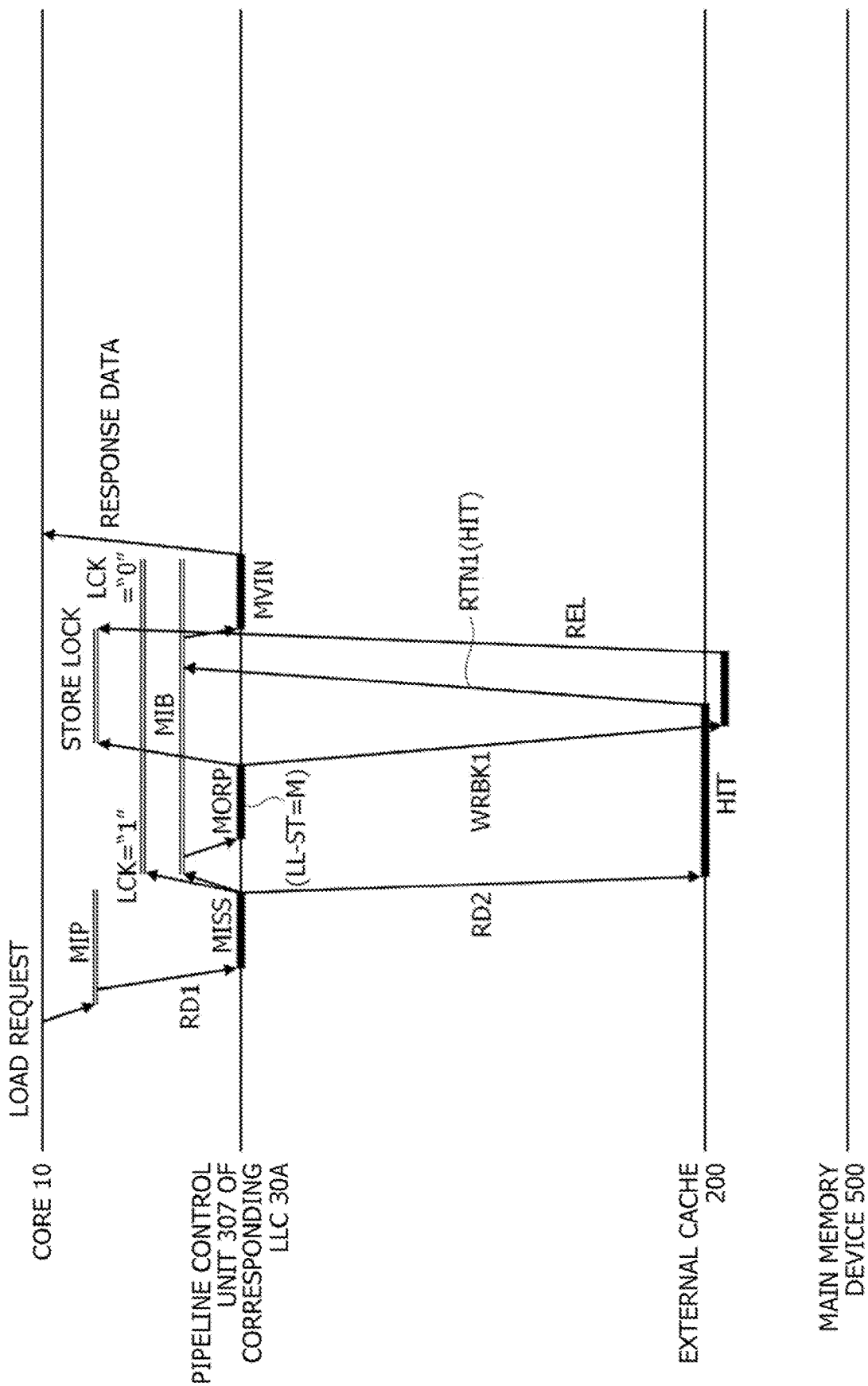
FIG. 14 is a timing chart illustrating an example of operations of the arithmetic processing device in FIG. 12.

FIG. 14 is a diagram illustrating an example of operations of the arithmetic processing device 100A in FIG. 12. The operations that are the same as or similar to those illustrated in FIG. 6 will not be described in detail. The operations illustrated in FIG. 14 are achieved by the arithmetic processing device 100A executing an arithmetic processing method. FIG. 14 illustrates the operations in a case where a read request RD having caused a cache miss in the LLC 30A causes a cache hit in the external cache 200.

Since the arithmetic processing device 100A does not include the home agent 140 illustrated in FIGS. 1 and 3, the lock control is performed by the LLC 30A. The operations in FIG. 14 are similar to the operations in FIG. 6 except that the LLC 30A issues various requests to the external cache 200, and responses from the external cache 200 are transferred to the LLC 30A that is the issuer of the requests.

Figure 15:
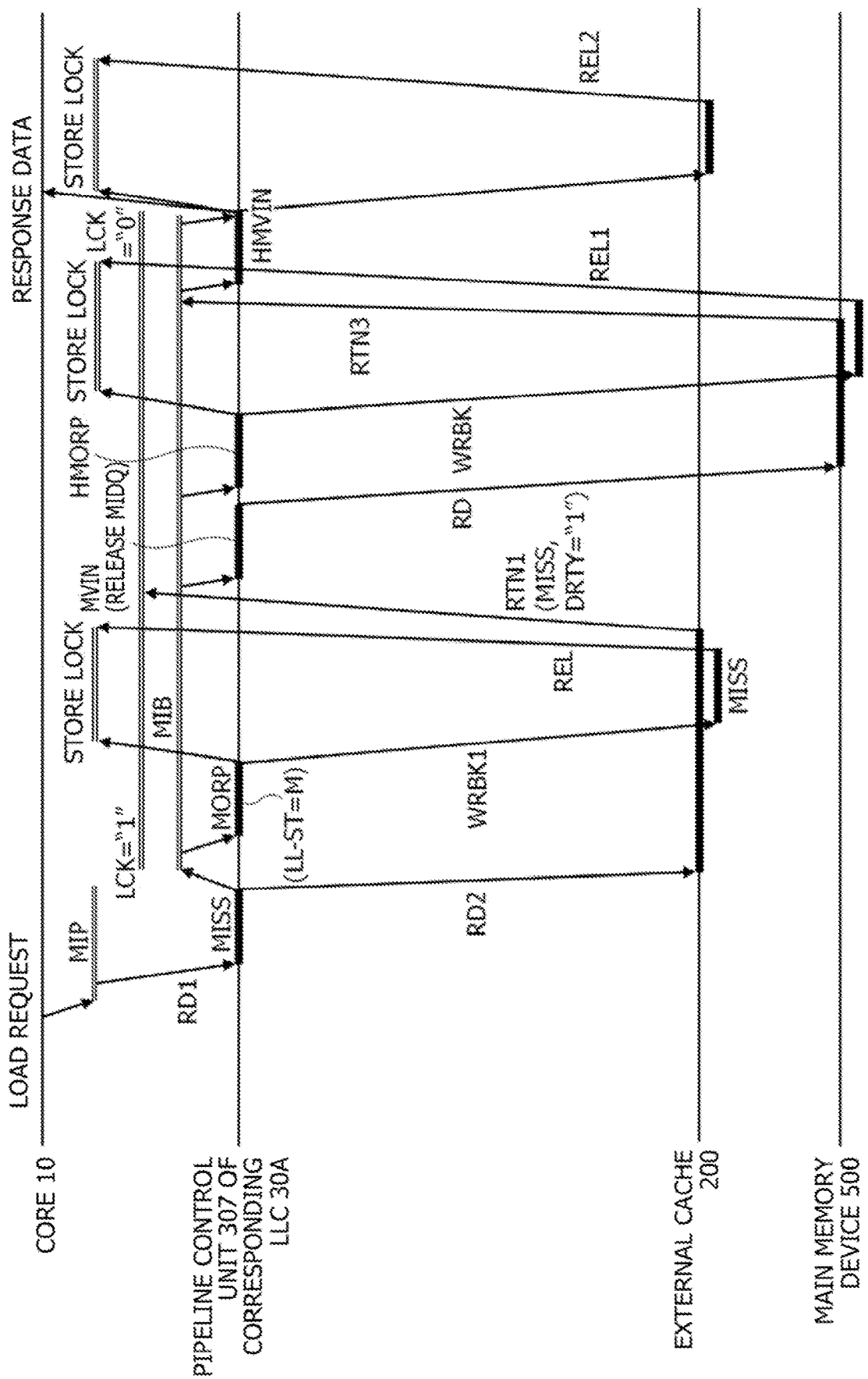
FIG. 15 is a timing chart illustrating another example of operations of the arithmetic processing device in FIG. 12.

FIG. 15 is a diagram illustrating another example of operations of the arithmetic processing device 100A in FIG. 12. The operations that are the same as or similar to those illustrated in FIG. 7 will not be described in detail. The operations illustrated in FIG. 15 are achieved by the arithmetic processing device 100A executing an arithmetic processing method. FIG. 15 illustrates an example in which a read request RD having caused a cache miss in the LLC 30A causes a cache miss in the external cache 200 and the data is read from the main memory device 500. At the time of executing the write-back operation from the LLC 30A, the write-back completion flag WRBK-CPLT of the write-back target entry is set to "0".

In FIG. 15, the lock control is performed by the LLC 30A. The operations in FIG. 15 are similar to the operations illustrated in FIG. 7 except that the LLC 30A issues various requests to the external cache 200, and responses from the external cache 200 are transferred to the LLC 30A that is the issuer of the requests.

Figure 16:
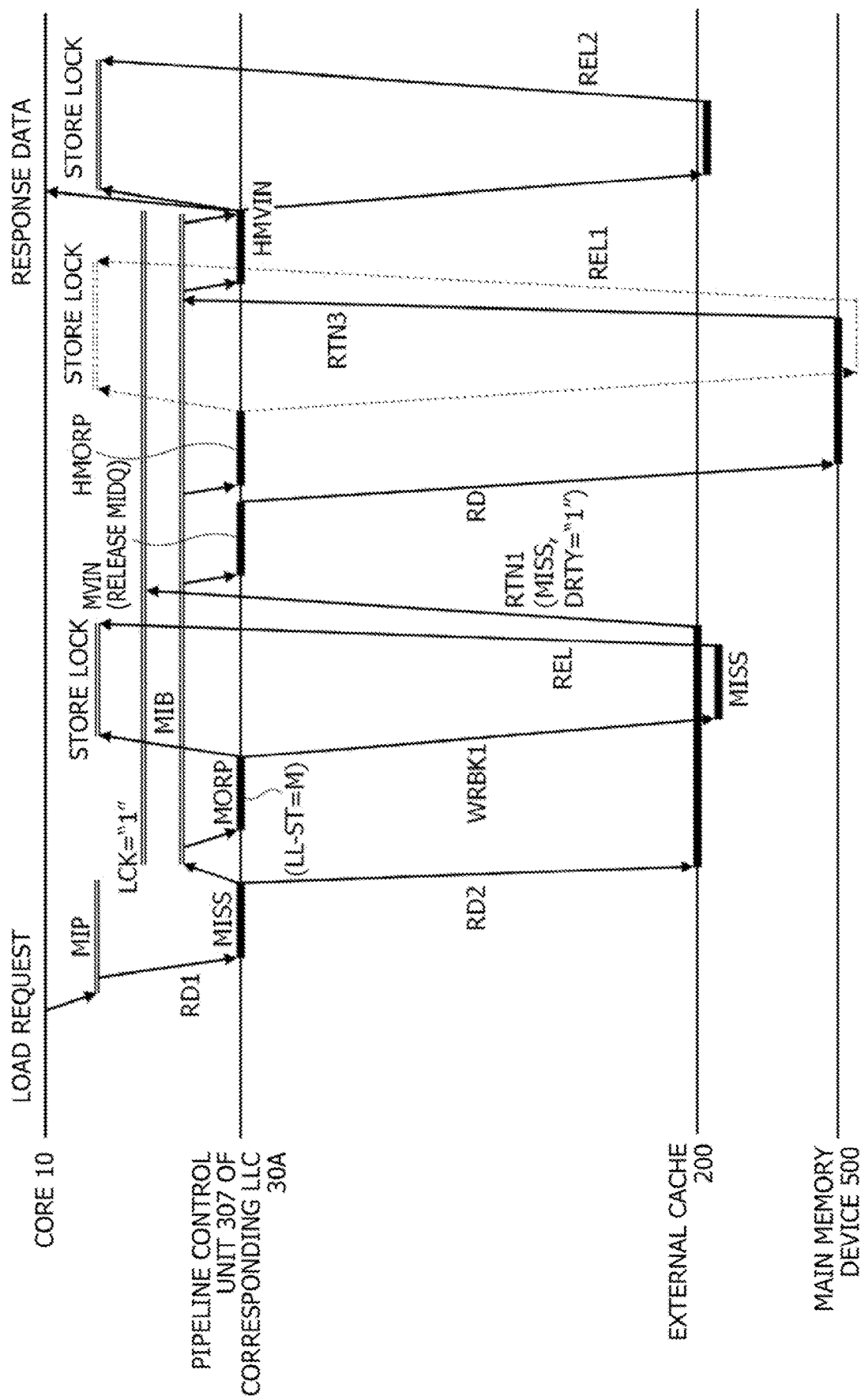
FIG. 16 is a timing chart illustrating still another example of operations of the arithmetic processing device in FIG. 12.

FIG. 16 is a diagram illustrating still another example of operations of the arithmetic processing device 100A in FIG. 12. The operations that are the same as or similar to those illustrated in FIG. 8 will not be described in detail. The operations illustrated in FIG. 16 are achieved by the arithmetic processing device 100A executing an arithmetic processing method. FIG. 16 illustrates an example in which a read request RD having caused a cache miss in the LLC 30A causes a cache miss in the external cache 200 and the data is read from the main memory device 500. At the time of executing the write-back operation from the LLC 30A, the write-back completion flag WRBK-CPLT of the write-back target entry is set to "1".

In FIG. 16, the lock control is performed by the LLC 30A. The operations in FIG. 16 are similar to the operations in FIG. 8 except that the LLC 30A issues various requests to the external cache 200, and responses from the external cache 200 are transferred to the LLC 30A that is the issuer of the requests. For example, in FIG. 16, since the write-back completion flag WRBK-CPLT of the write-back target entry in the LLC-TAG 303A is "1", the LLC 30A determines to cancel the write-back operation. Thus, it is possible to keep the write-back operation for the same address from being performed twice.

An operation flow of the arithmetic processing device 100A is similar to the operations in FIGS. 9 to 11 except that the LLC 30A mainly performs the processes. In this embodiment, steps S102 and S104 in FIG. 9 are deleted.

As described above, this embodiment is also capable of producing the effects similar to those in the foregoing embodiments. For example, by referring to the inclusion valid flag EC-VAL, the LLC 30A is able to determine the write-back location of the data held in the LLC 30A without reading the tag information from the TAG 201 of the external cache 200. Since an access to the external cache 200 for determining the write-back location may be omitted, a degradation in the memory access efficiency may be suppressed. Accordingly, in the arithmetic processing device 100A including the caches in the hierarchical structure, a degradation in the cache access efficiency may be suppressed.

The LLC 30A is able to cancel the write-back from the external cache 200 to the main memory device 500 when the write-back completion flag WRBK-CPLT of the LLC-TAG 303A is set. Thus, it is possible to keep the write-back operation for the same address from being performed twice, and to suppress a degradation in the cache access efficiency. It is also possible to keep the data written back from the LLC 30A to the main memory device 500 from being overwritten with the old data from the external cache 200, and to inhibit a malfunction of the arithmetic processing device 100.

Features and advantages of the embodiments are clarified from the above detailed description. The scope of claims is intended to cover the features and advantages of the embodiments described above within a scope not departing from the spirit and scope of right of the claims. Any person having ordinary skill in the art may easily conceive every improvement and alteration. Accordingly, the scope of inventive embodiments is not intended to be limited to that described above and may rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   an arithmetic circuit that executes an instruction;
   a first cache which is coupled to the arithmetic circuit and which has a plurality of first entries each including a first tag region and a first data region that holds cache line data;
   a processor which includes a second tag region and controls the first cache based on information held in the second tag region; and
   a second cache which is coupled to the first cache via the processor and which includes a plurality of second entries each of which includes a third tag region and a second data region that holds cache line data,
   the second tag region includes a first region that holds first information which specifies whether or not the second data region holds cache line data which has the same address as the address of cache line data held in the first data region, and in accordance with the first information held in the second tag region which corresponds to write-back target cache line data, the processor determines whether a write-back location to which the cache line data held in the first cache is to be written back is the second cache or an external memory.

2. The arithmetic processing device according to claim 1, wherein in a case where cache line data is to be transferred from the second cache to the first cache, the processor sets the first information in association with the cache line data to be transferred to a value which indicates that the second cache is the write-back location, and in a case where cache line data which has the same address as the address of the cache line data held in the first cache is to be written back from the second cache to the external memory, the processor sets the first information which corresponds to the cache line data to be written back to a value which indicates that the external memory is the write-back location.

3. The arithmetic processing device according to claim 2, wherein in a case where, in searching the second tag region for an access target address, an entry is detected in which a bit value which corresponds to an index address of the third tag region matches the index address and a bit value which corresponds to a tag address of the third tag region does not match the tag address, the processor sets the first information of the detected entry to a value which indicates that the external memory is the write-back location.

4. The arithmetic processing device according to claim 1, wherein the second tag region includes a second region that holds second information that is set in a case where the cache line data held in the first cache is written back to the external memory and cache line data which has the same address as the address of the cache line data written back remains in the second cache, and in a case where the second information in association with write-back target cache line data held in the second cache is set, the processor keeps the write-back target cache line data from being written back from the second cache to the external memory.

5. The arithmetic processing device according to claim 1, wherein the arithmetic circuit and the first cache are included in one of a plurality of cache blocks and the processor is disposed between the plurality of cache blocks and the second cache.

6. The arithmetic processing device according to claim 4, wherein the second tag region includes the first region and a region that holds part of a plurality of types of tag information held in the first tag region.

7. The arithmetic processing device according to claim 1, wherein the second tag region and the processor are included in the first cache.

8. The arithmetic processing device according to claim 1, wherein each of the plurality of first entries in the first cache has a plurality of ways, and each of the plurality of second entries in the second cache has a single way.

9. The arithmetic processing device according to claim 1, comprising a die on which the arithmetic circuit and the first cache which are included in one of a plurality of cache blocks are mounted; and a package in which the die and the second cache are mounted, wherein the processor is coupled to the external memory disposed outside the package.

10. An arithmetic processing device comprising:
    controlling, by a processor which includes a second tag region which includes a first region that holds first information which specifies whether or not the second data region holds cache line data which has the same address as the address of cache line data held in the first data region and is included in an arithmetic processing device including an arithmetic circuit that executes an instruction, a first cache which is coupled to the arithmetic circuit and which has a plurality of first entries each including a first tag region and a first data region that holds cache line data, and a second cache which is coupled to the first cache via the processor; and
    in accordance with the first information held in the second tag region which corresponds to write-back target cache line data, determining whether a write-back location to which the cache line data held in the first cache is to be written back is the second cache or an external memory.

* * * * *